US009393953B2

(12) United States Patent
Murata

(10) Patent No.: US 9,393,953 B2
(45) Date of Patent: Jul. 19, 2016

(54) TRANSMISSION FOR VEHICLE AND CONTROL DEVICE

(71) Applicant: Kiyohito Murata, Susono (JP)

(72) Inventor: Kiyohito Murata, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/646,614

(22) PCT Filed: Dec. 25, 2012

(86) PCT No.: PCT/JP2012/083514
§ 371 (c)(1),
(2) Date: May 21, 2015

(87) PCT Pub. No.: WO2014/102908
PCT Pub. Date: Jul. 3, 2014

(65) Prior Publication Data
US 2015/0283995 A1    Oct. 8, 2015

(51) Int. Cl.
*B60W 10/113*    (2012.01)
*B60W 20/00*    (2016.01)
(Continued)

(52) U.S. Cl.
CPC .............. *B60W 20/1088* (2013.01); *B60K 6/30* (2013.01); *B60K 6/48* (2013.01); *B60W 10/02* (2013.01); *B60W 10/08* (2013.01); *B60W 10/113* (2013.01); *B60W 20/00* (2013.01); *B60W 30/18027* (2013.01); *F16D 48/062* (2013.01); *F16D 48/08* (2013.01); *F16H 3/006* (2013.01); *F16H 3/089* (2013.01); *F16H 3/725* (2013.01); *F16D 2500/3065* (2013.01); *F16D 2500/3067* (2013.01); *F16D 2500/30816* (2013.01);

(Continued)

(58) Field of Classification Search
None
See application file for complete search history.

(56) References Cited

U.S. PATENT DOCUMENTS 6,190,280 B1 *    2/2001    Horsch ................. F16H 37/042
                                                                  475/209
7,093,512 B2    8/2006    Ibamoto et al.
(Continued)

FOREIGN PATENT DOCUMENTS

JP    2002-204504 A    7/2002
JP    2007-224965 A    9/2007
WO    01/66971 A    9/2001

OTHER PUBLICATIONS

International Search Report Issued Jan. 29, 2013 in PCT/JP12/083514 Filed Dec. 25, 2012.

*Primary Examiner* — Justin Holmes
(74) *Attorney, Agent, or Firm* — Oblon, McClelland, Maier & Neustadt, L.L.P.

(57) ABSTRACT

A transmission for vehicle includes: a transmission mechanism including a first engagement device configured to block/allow power transmission between an engine and a first input shaft of a first gear stage group, and a second engagement device configured to block/allow power transmission between the engine and a second input shaft of a second gear stage group; a differential mechanism; and a control device. The first gear stage group includes a starting stage used at a time the vehicle starts traveling, and the control device performs travel starting control to start traveling of the vehicle by: putting the second engagement device into an engaged state while the engine is operating before the vehicle starts traveling; and putting the second engagement device into a disengaged state, thereafter controlling rotation of a rotational machine and putting the first engagement device into an engaged state at the time the vehicle starts traveling.

9 Claims, 17 Drawing Sheets

(51) Int. Cl.

| | |
|---|---|
| *B60K 6/30* | (2007.10) |
| *B60K 6/48* | (2007.10) |
| *B60W 10/02* | (2006.01) |
| *B60W 10/08* | (2006.01) |
| *B60W 30/18* | (2012.01) |
| *F16H 3/00* | (2006.01) |
| *F16H 3/72* | (2006.01) |
| *F16H 3/089* | (2006.01) |
| *F16D 48/06* | (2006.01) |
| *F16D 48/08* | (2006.01) |

(52) U.S. Cl.
CPC . *F16D2500/3108* (2013.01); *F16D 2500/3144* (2013.01); *F16D 2500/70458* (2013.01); *F16H 2200/0043* (2013.01); *Y02T 10/6221* (2013.01); *Y10S 903/93* (2013.01); *Y10T 477/26* (2015.01)

(56) References Cited

U.S. PATENT DOCUMENTS

| | | | |
|---|---|---|---|
| 7,628,720 B2 | 12/2009 | Sakamoto et al. | |
| 2001/0022245 A1* | 9/2001 | Rogg | B60K 6/365 180/65.21 |
| 2013/0196805 A1* | 8/2013 | Phillips | B60K 6/445 475/5 |
| 2013/0331227 A1* | 12/2013 | Kato | B60K 6/48 477/3 |

* cited by examiner

TRANSMISSION FOR VEHICLE AND CONTROL DEVICE

FIELD

The present invention relates to a transmission for vehicle and a control device.

BACKGROUND

Patent Literature 1 discloses a power transmission system for vehicle which transmits rotation of an engine to a transmission gear through any one of a first clutch shaft and a second clutch shaft during travel of a vehicle, for example, as a transmission for vehicle and a control device mounted on the vehicle. The power transmission system for vehicle drives a motor generator to generate electric power by using difference between an input rotational speed of the transmission gear used for the travel and an input rotational speed of the transmission gear not for the travel. The power transmission system for vehicle extracts the difference between the input rotational speed of the transmission gear used for the travel and the input rotational speed of the transmission gear not for the travel by using a planetary gear and a coupling gear, for example, and connects to the motor generator to which a stator is fixed.

CITATION LIST

Patent Literature

Patent Literature 1: Japanese Patent Application Laid-open No. 2002-204504

SUMMARY

Technical Problem

The power transmission system for vehicle disclosed in Patent Literature 1 described above has a room for improvement in improving starting performance, for example.

The present invention is achieved in view of the above-described circumstances and an object thereof is to provide the transmission for vehicle and the control device capable of improving the starting performance.

Solution to Problem

To achieve the object, a transmission for vehicle according to the present invention includes: a transmission mechanism including: a first engagement device configured to block/allow power transmission between an engine which generates rotational power for allowing a vehicle to travel and a first input shaft of a first gear stage group; and a second engagement device configured to block/allow power transmission between the engine and a second input shaft of a second gear stage group; a differential mechanism which connects a rotational shaft of a rotational machine, the first input shaft, and the second input shaft so as to be differentially rotatable; and a control device configured to perform travel starting control to start traveling of the vehicle by controlling the engine, the first engagement device, the second engagement device, and the rotational machine, wherein the first gear stage group includes a starting stage used at a time the vehicle starts traveling, and the control device is configured to perform the travel starting control to start traveling of the vehicle by: putting the second engagement device into an engaged state while the engine is operating before the vehicle starts traveling; and putting the second engagement device into a disengaged state, thereafter controlling rotation of the rotational machine and putting the first engagement device into an engaged state at the time the vehicle starts traveling.

Moreover, in the above-described transmission for vehicle, the second engagement device is put into the engaged state while the engine is operating, so that the second input shaft stores the rotational power transmitted from the engine through the second engagement device as inertia energy before the vehicle starts traveling, and at the time the vehicle starts traveling, the second engagement device is put into the disengaged state, thereafter rotation of the rotational machine is controlled and the first engagement device is put into the engaged state, so that the second input shaft discharges the stored inertia energy to the first input shaft through the differential mechanism as the power used for starting traveling of the vehicle.

Moreover, in the above-described transmission for vehicle, the control device generates electric power by the rotational machine by using the rotational power transmitted from the second input shaft to the rotational machine through the differential mechanism and stores generated electric energy in an electric storage device at the time the second engagement device is put into the disengaged state, thereafter controlling the rotation of the rotational machine, and putting the first engagement device into the engaged state at the time the vehicle starts traveling.

Moreover, in the above-described transmission for vehicle, the control device generates electric power by the rotational machine by using the rotational power transmitted from the engine to the rotational machine through the second engagement device, the second input shaft, and the differential mechanism and stores the generated electric energy in the electric storage device by putting the second engagement device into the engaged state while the engine is operating before the vehicle starts traveling.

Moreover, in the above-described transmission for vehicle, the control device controls the rotational machine to output the rotational power as the power used for starting traveling of the vehicle after a rotational speed of the rotational machine reaches 0 at the time the second engagement device is put into the disengaged state, thereafter controls the rotation of the rotational machine, and puts the first engagement device into the engaged state at the time the vehicle starts traveling.

Moreover, in the above-described transmission for vehicle, the control device puts the second engagement device into the engaged state while the engine is operating to store the rotational power transmitted from the engine to the second input shaft through the second engagement device as inertia energy before the vehicle starts traveling, thereafter puts the second engagement device into the disengaged state, controls the rotational machine to output the rotational power, and stores the rotational power in the second input shaft as the inertia energy.

Moreover, the above-described transmission for vehicle further includes an inertia mass body connected to the second input shaft.

Moreover, in the above-described transmission for vehicle, the control device is configured to adjust a torque ratio by controlling the rotation of the rotational machine at the time the vehicle starts traveling.

To achieve the object, a control device of a transmission for vehicle according to the present invention includes: a transmission mechanism including: a first engagement device configured to block/allow power transmission between an engine which generates rotational power for allowing a vehicle to travel and a first input shaft of a first gear stage group; and a second engagement device configured to block/allow power transmission between the engine and a second input shaft of a second gear stage group; and a differential mechanism which connects a rotational shaft of a rotational machine, the first input shaft, and the second input shaft so as to be differentially rotatable, wherein the control device is configured to perform travel starting control to start traveling of the vehicle by controlling the engine, the first engagement device, the second engagement device, and the rotational machine, the first gear stage group includes a starting stage used at a time the vehicle starts traveling, and the control device is configured to perform the travel starting control to start traveling of the vehicle by: putting the second engagement device into an engaged state while the engine is operating before the vehicle starts traveling; and putting the second engagement device into a disengaged state, thereafter controlling rotation of the rotational machine and putting the first engagement device into an engaged state at the time the vehicle starts traveling.

Advantageous Effects of Invention

The transmission for vehicle and the control device according to the present invention have an effect of improving the starting performance.

DESCRIPTION OF EMBODIMENTS

Embodiments according to the present invention are hereinafter described in detail with reference to the drawings. Meanwhile, the present invention is not limited by the embodiments. Components in the following embodiments include a component easily replaced by one skilled in the art or a substantially identical component.

[First Embodiment]

Figure 1:
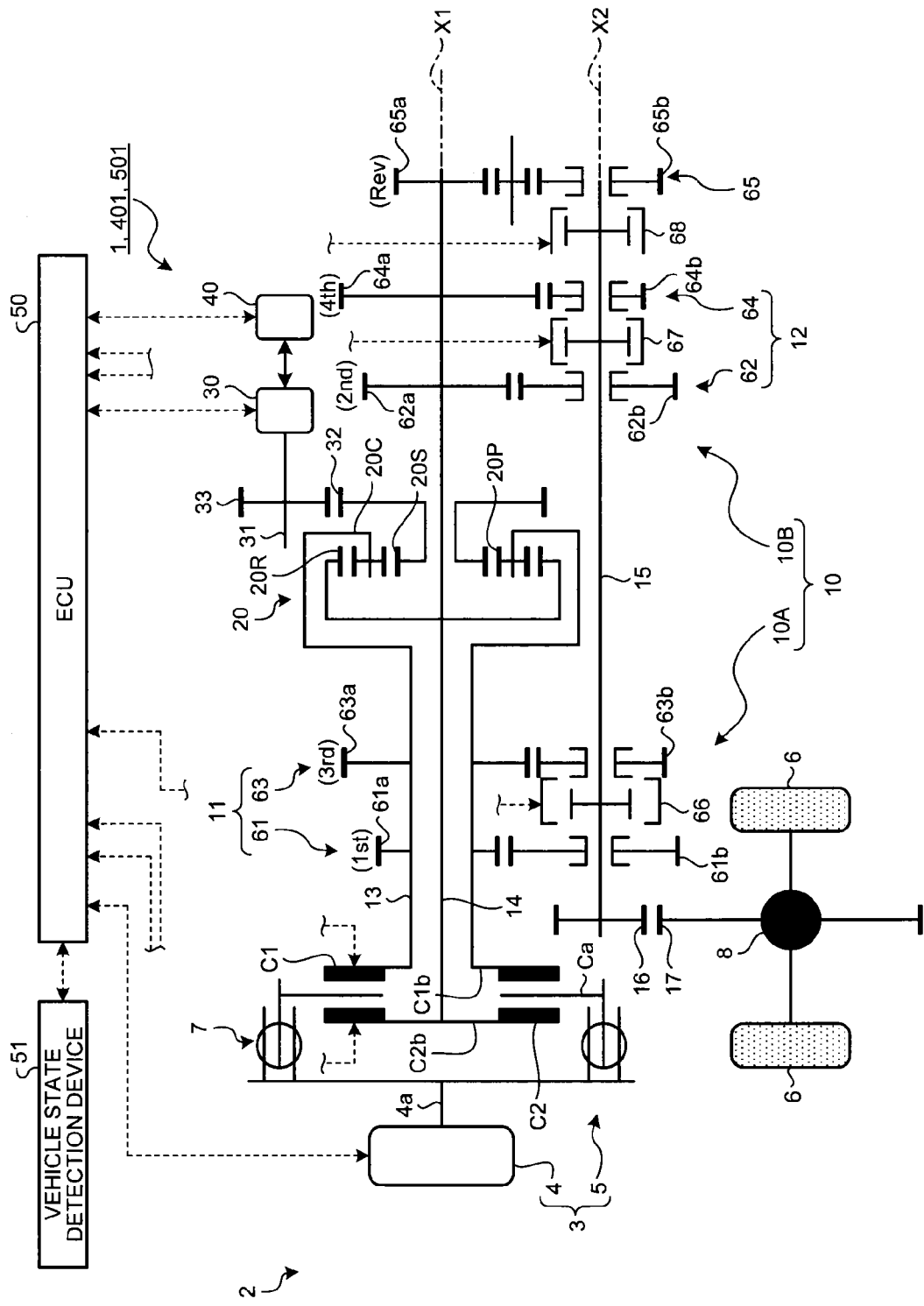
FIG. 1 is a schematic configuration diagram of a vehicle on which a transmission according to a first embodiment is mounted.
Figure 2:
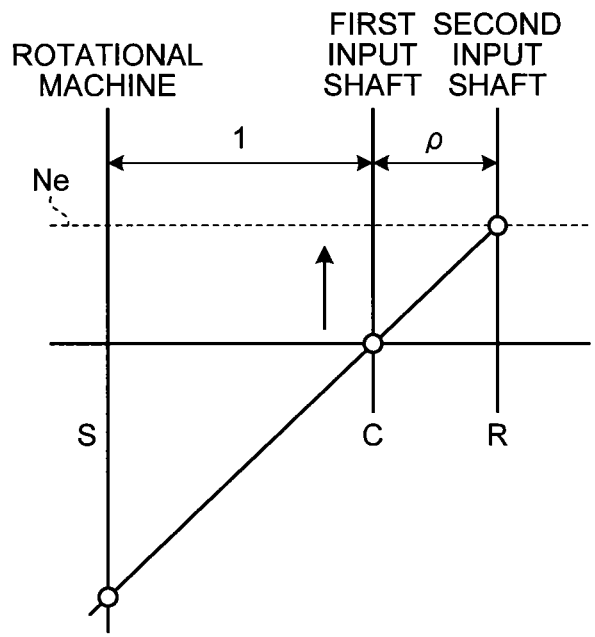
FIG. 2 is an alignment chart illustrating an example of operation before a start of the transmission according to the first embodiment.
Figure 3:
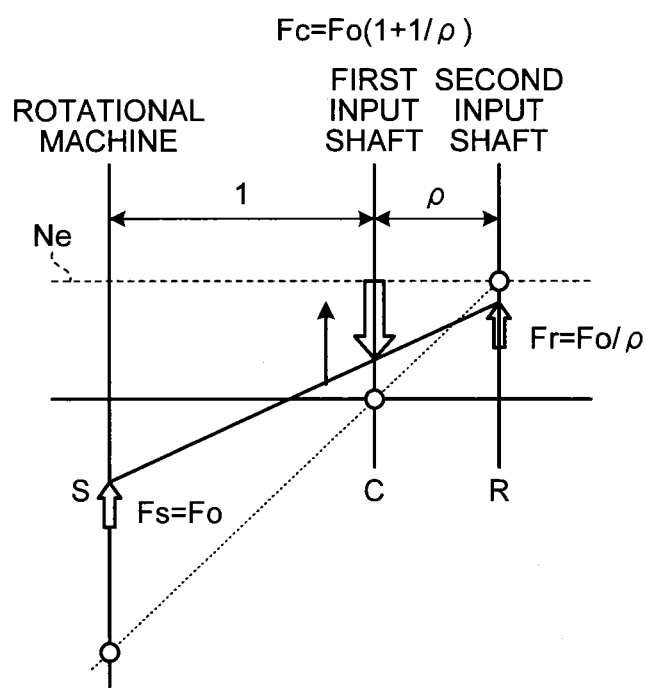
FIG. 3 is an alignment chart illustrating an example of the operation at the time of the start traveling of the transmission according to the first embodiment.
Figure 4:
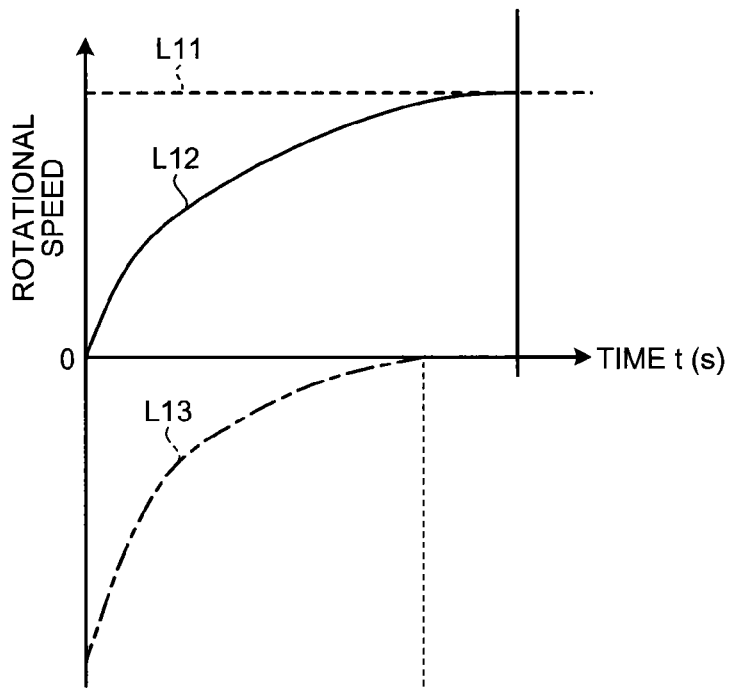
FIG. 4 is a diagram illustrating operation of an engagement device of the transmission according to the first embodiment.
Figure 5:
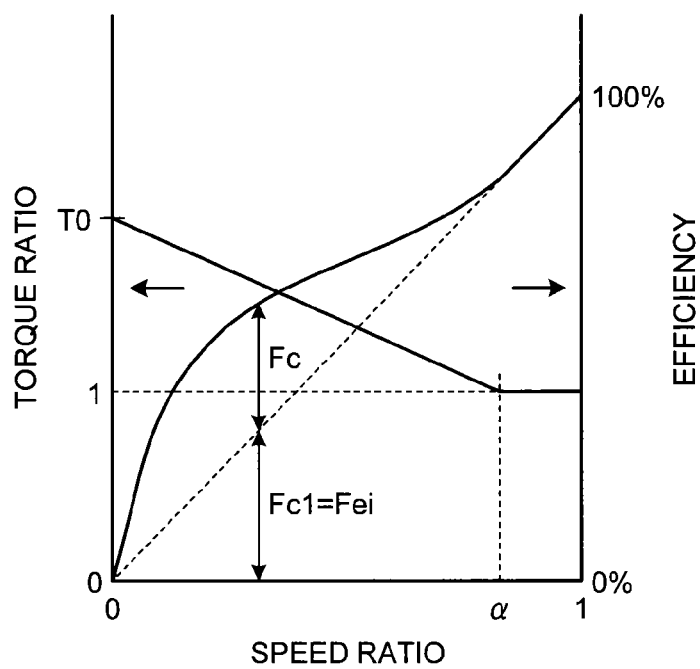
FIG. 5 is a diagram illustrating an example of a torque property of the transmission according to the first embodiment.
Figure 6:
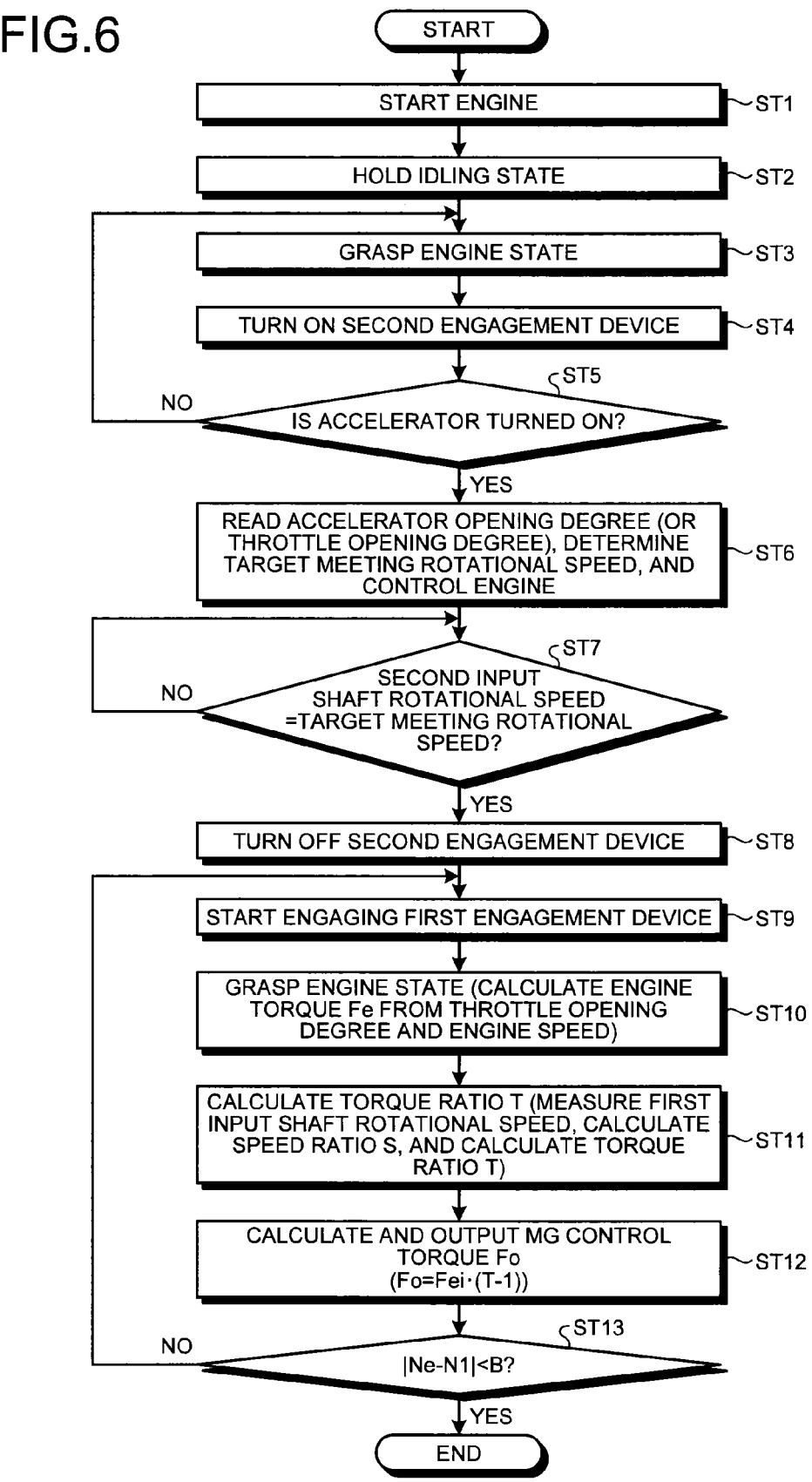
FIG. 6 is a flowchart illustrating an example of control of the transmission according to the first embodiment.
Figure 7:
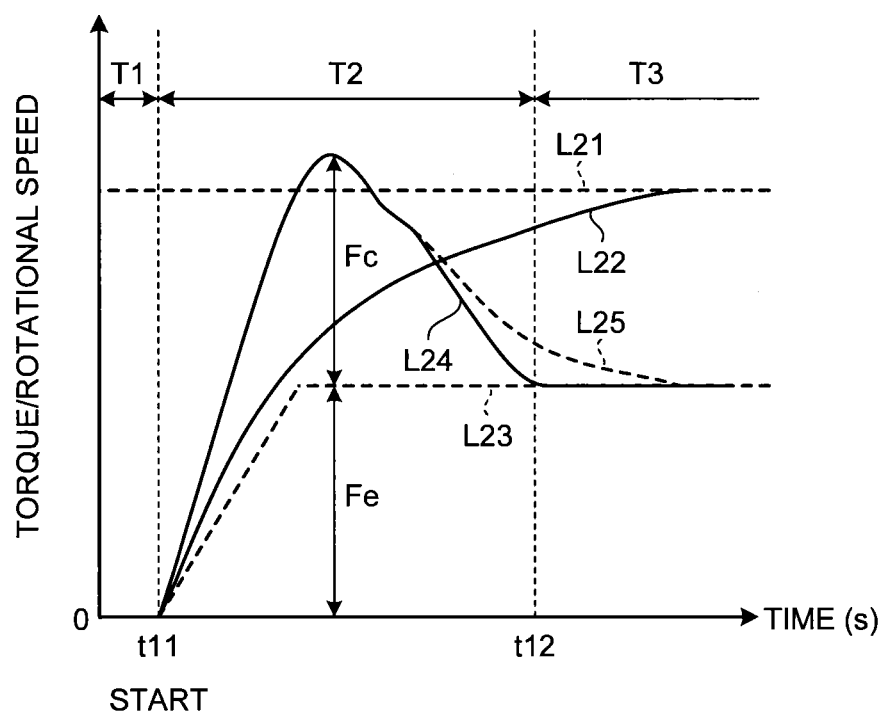
FIG. 7 is a diagram illustrating an example of the operation of the transmission according to the first embodiment.

FIG. 1 is a schematic configuration diagram of a vehicle on which a transmission according to a first embodiment is mounted. FIG. 2 is an alignment chart illustrating an example of operation before a start of the transmission according to the first embodiment. FIG. 3 is an alignment chart illustrating an example of operation at the time of the start traveling of the transmission according to the first embodiment. FIG. 4 is a diagram illustrating operation of an engagement device of the transmission according to the first embodiment. FIG. 5 is a diagram illustrating an example of a torque property of the transmission according to the first embodiment. FIG. 6 is a flowchart illustrating an example of control of the transmission according to the first embodiment. FIG. 7 is a diagram illustrating an example of the operation of the transmission according to the first embodiment.

Meanwhile, in the following description, a direction along a rotational axis is referred to as an axial direction, a direction orthogonal to the rotational axis, that is to say, the direction orthogonal to the axial direction is referred to as a radial direction, and a direction around the rotational axis is referred to as a circumferential direction unless otherwise noted. A side on the rotational axis in the radial direction is referred to as a radial inner side, and the other side is referred to as a radial outer side.

A transmission 1 as a transmission for vehicle of this embodiment is applied to a power train 3 mounted on a vehicle 2 as illustrated in FIG. 1. The transmission 1 typically obtained by coupling a rotational machine 30 to two input shafts (first and second input shafts 13 and 14) of a dual clutch transmission (DCT) type transmission mechanism 10 through a differential mechanism 20 controls differential rotation of both shafts by the rotational machine 30. The transmission 1 stores energy (inertia energy, electric energy and the like) by using a shaft which is not provided with a starting stage used at the time of the start traveling out of the two input shafts before the vehicle 2 starts traveling, for example, and uses the energy at the time of the start traveling. The transmission 1 may also control rotation of the rotational machine 30, thereby realizing an apparent torque amplifying function when the vehicle 2 starts traveling, for example. According to this, the transmission 1 may cover from the start to a high-speed travel range while improving a starting performance without widening a set interval of gear ratios at respective gear stages, for example, and may ensure a clutch lifetime.

The power train 3 of the vehicle 2 to which the transmission 1 is applied includes an engine 4 which generates rotational power for allowing the vehicle 2 to travel, a power transmission device (transmission) 5 capable of transmitting the rotational power generated by the engine 4 from the engine 4 to a driven wheel 6 and the like. The engine 4 typically is a thermal engine such as an engine (internal-combustion engine) which converts energy of fuel to mechanical work by combustion of the fuel in a combustion chamber to output as the power. The power transmission device 5 includes a damper 7, the transmission 1, a differential gear 8 and the like. In the power transmission device 5, the power generated by the engine 4 is transmitted to the damper 7 and the rotational power transmitted to the damper 7 is transmitted to the transmission 1. The power transmission device 5 may change a speed of the rotational power from the engine 4 by the transmission 1 to transmit to the driven wheel 6 of the vehicle 2, for example. The engine 4, the transmission 1 and the like are controlled by an ECU 50. Therefore, in the vehicle 2, when an engine output shaft (crankshaft) 4a of the engine 4 is rotationally driven, the power thereof is input through the damper 7 and the like to the transmission 1, by which the speed thereof is changed, to be transmitted to each driven wheel 6 through the differential gear 8 and the like. According to this, the vehicle 2 may move forward or rearward by rotation of each driven wheel 6.

The transmission 1 of this embodiment provided on a transmission path of the power from the engine 4 to the driven wheel 6 may change the speed of the rotational power transmitted from the engine 4 to the driven wheel 6 to output. The power transmitted to the transmission 1, the speed of which is changed by the transmission 1 at a predetermined gear ratio (=input rotational speed/output rotational speed), is transmitted to each driven wheel 6. The transmission 1 is provided with the dual clutch-type transmission mechanism 10, the differential mechanism 20, the rotational machine 30, an electric storage device 40, and the ECU 50 as a control device.

The transmission mechanism 10 includes an odd-numbered gear stage group 11 as a first gear stage group, an even-numbered gear stage group 12 as a second gear stage group, the first input shaft 13, the second input shaft 14, an output shaft 15, a first engagement device C1, a second engagement device C2 and the like. The transmission mechanism 10 may output the rotational power input from the engine 4 to the first input shaft 13 or the second input shaft 14 through the damper 7 and the like from the output shaft 15 to the driven wheel 6 after changing the speed thereof by any one gear stage of the odd-numbered gear stage group 11 or the even-numbered gear stage group 12.

The odd-numbered gear stage group 11 formed of a plurality of gear stages (gear stages) to each of which a predetermined gear ratio is assigned is herein formed of a first-speed gear stage 61 and a third-speed gear stage 63 for forward movement as odd-numbered stages. That is to say, the odd-numbered gear stage group 11 forms an odd-numbered stage transmission unit (first transmission unit) 10A. The odd-numbered stage transmission unit 10A further includes a switching unit 66 and the like in addition to the odd-numbered gear stage group 11. The even-numbered gear stage group 12 formed of a plurality of gear stages (gear stages) to each of which a predetermined gear ratio is assigned is formed of a second-speed gear stage 62 and a fourth-speed gear stage 64 for forward movement as even-numbered stages. The even-numbered gear stage group 12 forms an even-numbered stage transmission unit (second transmission unit) 10B. The even-numbered stage transmission unit 10B includes a reverse stage 65 for rearward movement, switching units 67 and 68 and the like in addition to the even-numbered gear stage group 12. The gear stages of the odd-numbered gear stage group 11 and the even-numbered gear stage group 12 are the first-speed gear stage 61, the second-speed gear stage 62, the third-speed gear stage 63, and the fourth-speed gear stage 64 in the order of gear ratios from the largest one.

The first input shaft 13 forming the input shaft of the odd-numbered gear stage group 11 is an input rotational member to which the rotational power from the engine 4 is input in the transmission 1. The second input shaft 14 forming the input shaft of the even-numbered gear stage group 12 is an input rotational member to which the rotational power from the engine 4 is input in the transmission 1. The first input shaft 13 is formed into a cylindrical shape. The second input shaft 14 is formed into a columnar shape. The second input shaft 14 is inserted into the first input shaft 13. The first input shaft 13 and the second input shaft 14 are supported on a case and the like through a bearing so as to be rotatable. The first input shaft 13 and the second input shaft 14 are supported so as to be rotatable around a rotational axis X1 by the power transmitted from the engine 4. The above-described rotational axis X1 coincides with the center of rotation of the engine output shaft 4a of the engine 4. That is to say, the engine output shaft 4a, the first input shaft 13, and the second input shaft 14 are coaxially arranged with the rotational axis X1.

The first engagement device C1 is provided on the first input shaft 13 at the end on an engine 4 side. An end opposite to the engine 4 of the first input shaft 13, that is to say, the end opposite to the first engagement device C1 is connected to the differential mechanism 20. On the first input shaft 13, the first engagement device C1, a drive gear 61a, and a drive gear 63a are arranged in this order from the engine 4 side. The second engagement device C2 is provided on the second input shaft 14 at the end on the engine 4 side. An end opposite to the engine 4 of the second input shaft 14, that is to say, the end opposite to the second engagement device C2 protrudes from the first input shaft 13 so as to be exposed. On the second input shaft 14, the second engagement device C2, the differential mechanism 20, a drive gear 62a, a drive gear 64a, and a drive gear 65a are arranged in this order from the engine 4 side. On the second input shaft 14, the differential mechanism 20, the drive gear 62a, the drive gear 64a, and the drive gear 65a are provided in a portion exposed from the first input shaft 13.

The output shaft 15 is an output rotational member which outputs the rotational power to the driven wheel 6 in the transmission 1. The output shaft 15 is supported on the case and the like through a bearing so as to be rotatable. The output shaft 15 is supported so as to be rotatable around a rotational axis X2 parallel to the rotational axis X1 by the power transmitted from the engine 4. The output shaft 15 serves as an outputting member common to the odd-numbered stage transmission unit 10A and the even-numbered stage transmission unit 10B. The output shaft 15 is connected to the driven wheel 6 through a drive gear 16, a driven gear 17, the differential gear 8 and the like so as to be able to transmit the power. To the output shaft 15, the drive gear 16 is coupled at the end on the engine 4 side so as to be integrally rotatable and a driven gear 65b is provided at the other end so as to be relatively rotatable. On the output shaft 15, the drive gear 16, a driven gear 61b, the switching unit 66, a driven gear 63b, a driven gear 62b, the switching unit 67, a driven gear 64b, the switching unit 68, and the driven gear 65b are arranged in this order from the engine 4 side.

As for the gear stages of the above-described odd-numbered gear stage group 11, the drive gears 61a and 63a are coupled to the first input shaft 13 so as to be integrally rotatable and the driven gears 61b and 63b are supported on the output shaft 15 through a bush and the like so as to be relatively rotatable with respect to the first input shaft 13. The drive gear 61a and the driven gear 61b form a gear pair of the first-speed gear stage 61 meshing with each other. The drive gear 63a and the driven gear 63b form a gear pair of the third-speed gear stage 63 meshing with each other. As for the gear stages of the even-numbered gear stage group 12, the drive gears 62a and 64a are coupled to the second input shaft 14 so as to be integrally rotatable and the driven gears 62b and 64b are supported on the output shaft 15 through a bush and the like so as to be relatively rotatable. The drive gear 62a and the driven gear 62b form a gear pair of the second-speed gear stage 62 meshing with each other. The drive gear 64a and the driven gear 64b form a gear pair of the fourth-speed gear stage 64 meshing with each other. As for the reverse stage 65, the drive gear 65a is coupled to the second input shaft 14 so as to be integrally rotatable and the driven gear 65b is supported on the output shaft 15 through a bush and the like so as to be relatively rotatable. The drive gear 65a and the driven gear 65b form a gear pair of the reverse stage 65 meshing with each other through a counter gear. Herein, as the transmission mechanism 10, the odd-numbered stage transmission unit 10A is arranged on the engine 4 side and the even-numbered stage transmission unit 10B is arranged on the other side across the differential mechanism 20 coaxially arranged with the rotational axis X1.

Each of the switching units 66, 67, and 68 forming the odd-numbered stage transmission unit 10A and the even-numbered stage transmission unit 10B includes a synchromesh mechanism and the like and is configured to switch between an engaged state and a disengaged state of the first-speed gear stage 61, the second-speed gear stage 62, the third-speed gear stage 63, the fourth-speed gear stage 64, and the reverse stage 65. The switching unit 66 selectively couples any one of the driven gear 61b and the driven gear 63b to the output shaft 15. In the switching unit 66, an engaging member such as a sleeve may move between a position on a driven gear 61b side and a position on a driven gear 63b side in the axial direction by an actuator. In the switching unit 66, when the engaging member is located on the driven gear 61b side, the driven gear 61b is coupled to the output shaft 15 and the driven gear 63b is released from the output shaft 15 to be put into an idling state. According to this, the odd-numbered stage transmission unit 10A may transmit the rotational power transmitted from the engine 4 to the first input shaft 13 to the output shaft 15 after changing the speed thereof through the first-speed gear stage 61. Similarly, in the switching unit 66, when the engaging member is located on the driven gear 63b side, the driven gear 63b is coupled to the output shaft 15 and the driven gear 61b is released from the output shaft 15 to be put into the idling state. In the odd-numbered stage transmission unit 10A, when the engaging member of the switching unit 66 is located in a neutral position, all the driven gear 61b and the driven gear 63b are released from the output shaft 15 to be put into the idling state. According to this, the odd-numbered stage transmission unit 10A may block the transmission of the power between the first input shaft 13 and the output shaft 15. The switching unit 67 selectively couples any one of the driven gear 62b and the driven gear 64b to the output shaft 15. In the switching unit 67, when an engaging member is located on a driven gear 62b side, the driven gear 62b is coupled to the output shaft 15 and the driven gear 64b is released from the output shaft 15 to be put into the idling state. According to this, the even-numbered stage transmission unit 10B may transmit the rotational power transmitted from the engine 4 to the second input shaft 14 to the output shaft 15 after changing the speed thereof through the second-speed gear stage 62. Similarly, in the switching unit 67, when the engaging member is located on a driven gear 64b side, the driven gear 64b is coupled to the output shaft 15 and the driven gear 62b is released from the output shaft 15 to be put into the idling state. In the switching unit 68, when an engaging member is located on a driven gear 65b side, the driven gear 65b is coupled to the output shaft 15. In the even-numbered stage transmission unit 10B, when the engaging members of the switching units 67 and 68 are located in a neutral position, all the driven gears 62b, 64b, and 65b are released from the output shaft 15 to be put into the idling state. According to this, the even-numbered stage transmission unit 10B may block the transmission of the power between the second input shaft 14 and the output shaft 15.

The first engagement device C1 provided between the engine 4 and the first input shaft 13 of the odd-numbered gear stage group 11 may block/allow the power transmission between the engine 4 and the first input shaft 13. The first engagement device C1 may be switched between an engaged state in which the engine 4 and the first input shaft 13 are engaged with each other such that the power may be transmitted and a disengaged state in which they are disengaged from each other and the power transmission is blocked. The second engagement device C2 provided between the engine 4 and the second input shaft 14 of the even-numbered gear stage group 12 may block/allow the power transmission between the engine 4 and the second input shaft 14. The second engagement device C2 may be switched between an engaged state in which the engine 4 and the second input shaft 14 are engaged with each other such that the power may be transmitted and a disengaged state in which they are disengaged from each other and the power transmission is blocked. Although an automatic clutch device may be used, for example, as the first engagement device C1 and the second engagement device C2, the devices are not limited to this, and a dog clutch-type engagement device and the like may also be used, for example. Herein, the first engagement device C1 includes an engine side engaging member Ca coupled to the engine output shaft 4a through the damper 7 and the like and a transmission side engaging member C1b coupled to the first input shaft 13. The second engagement device C2 includes the engine side engaging member Ca which is also used by the first engagement device C1 and a transmission side engaging member C2b coupled to the second input shaft 14. The first engagement device C1 and the second engagement device C2 may be switched between the engaged state and the disengaged state by an actuator operated by hydraulic pressure and the like. The first engagement device C1 and the second engagement device C2 may be controlled to a fully-engaged state, a semi-engaged state, or the disengaged state according to supplied hydraulic pressure.

The differential mechanism 20 is configured to connect a rotational shaft 31 of the rotational machine 30, the first input shaft 13, and the second input shaft 14 so as to be differentially rotatable. Although the differential mechanism 20 of this embodiment is described to be formed of a so-called single pinion planetary gear mechanism, the mechanism is not limited to this, and may also be formed of a double pinion planetary gear mechanism, for example. In the differential mechanism 20, the centers of rotation of rotational elements capable of differentially rotating relative to one another are coaxially arranged with the rotational axis X1. Each rotational element to which the power is transmitted may rotate around the rotational axis X1. Herein, the differential mechanism 20 includes a sun gear 20S, a ring gear 20R, and a carrier 20C as a plurality of rotational elements capable of differentially rotating relative to one another. The sun gear 20S is an external tooth gear. The ring gear 20R is an internal tooth gear coaxially arranged with the sun gear 20S. The carrier 20C holds a plurality of pinion gears 20P meshing with the sun gear 20S or the ring gear 20R (herein both of them) so as to be rotatable and revolvable.

In the differential mechanism 20 of this embodiment, the sun gear 20S is the element connected to the rotational shaft 31 of the rotational machine 30, the ring gear 20R is the element connected to the second input shaft 14, and the carrier 20C is the element connected to the first input shaft 13. The sun gear 20S is formed into an annular shape to which the rotational shaft 31 of the rotational machine 30 is connected through a gear 32, a gear 33 and the like. The gear 32 is coupled to the sun gear 20S so as to be integrally rotatable. The gear 33 is coupled to the rotational shaft 31 so as to be integrally rotatable to mesh with the gear 32. The ring gear 20R is formed into an annular shape to be coupled to the second input shaft 14 so as to be integrally rotatable. The carrier 20C is formed into an annular shape to support the pinion gear 20P being the external tooth gear on a pinion shaft so as to be rotatable and revolvable. The carrier 20C is coupled to the first input shaft 13 so as to be integrally rotatable.

The rotational machine 30 is a rotational electrical machine having a function as a motor (electric motor) and a function as a power generator. The rotational machine 30 has a power running function to convert electric power supplied from the electric storage device 40 such as a battery through an inverter and the like to mechanical power and a regenerating function to convert the input mechanical power to the electric power to charge the electric storage device 40 through the inverter and the like. The electric power generated by the rotational machine 30 may be stored in the electric storage device 40. An AC synchronous motor generator may be used, for example, as the rotational machine 30. The electric storage device 40 may store the electric power generated by the rotational machine 30. The rotational machine 30 may consume the electric power to output torque and rotationally drive the rotational shaft 31 by the output torque at the time of power running. The rotational machine 30 may be rotationally driven by the torque transmitted to the rotational shaft 31 to generate electric power, thereby applying load torque (reaction force torque) according to a power generation load on the rotational shaft 31 at the time of regeneration.

The ECU 50 which controls driving of each unit of the vehicle 2 includes an electronic circuit a main body of which is a well-known microcomputer including a CPU, a ROM, a RAM, and an interface. To the ECU 50, various sensors and detectors are electrically connected, for example, and electric signals corresponding to detection results are input. The ECU 50 is electrically connected to each unit of the vehicle 2 such as the engine 4, the first engagement device C1 and the second engagement device C2 of the transmission 1, the actuator which operates the switching units 66, 67, 68 and the like, the rotational machine 30, and the electric storage device 40. The ECU 50 executes a stored control program based on various input signals input from the various sensors, detectors and the like and various maps, thereby outputting driving signals to respective units of the vehicle 2 to control the driving of them.

The transmission 1 of this embodiment is provided with a vehicle state detection device 51 which detects a state of the vehicle 2 on which the transmission 1 is mounted, for example, as the various sensors and detectors. The vehicle state detection device 51 may include at least one of a vehicle speed sensor, an accelerator opening degree sensor, a throttle opening degree sensor, an engine speed sensor, a first input shaft rotational speed sensor, a second input shaft rotational speed sensor, an output shaft rotational speed sensor, a rotational shaft rotational speed sensor, a charging state detector, a sports travel switch and the like, for example, but there is no limitation. The vehicle speed sensor detects a vehicle speed of the vehicle 2. The accelerator opening degree sensor detects an accelerator opening degree corresponding to an operation amount of an accelerator pedal (accelerator operation amount and acceleration request operation amount) of the vehicle 2 by a driver. The throttle opening degree sensor detects a throttle opening degree of the vehicle 2. The engine speed sensor detects an engine speed being a rotational speed of the engine output shaft 4a of the engine 4 (hereinafter, sometimes also referred to as "engine speed"). The first input shaft rotational speed sensor detects a rotational speed of the first input shaft 13 (hereinafter, sometimes also referred to as "first input shaft rotational speed") of the transmission 1. The second input shaft rotational speed sensor detects a rotational speed of the second input shaft 14 (hereinafter, sometimes also referred to as "second input shaft rotational speed") of the transmission 1. The output shaft rotational speed sensor detects a rotational speed of the output shaft 15 (hereinafter, sometimes also referred to as "output shaft rotational speed") of the transmission 1. The rotational shaft rotational speed sensor detects a rotational speed of the rotational shaft 31 of the rotational machine 30 (hereinafter, sometimes also referred to as "rotational machine rotational speed"). The charging state detector detects an electric storage state SOC (state of charge) according to an electric storage amount (charge amount) and the like of the electric storage device 40. The larger the electric storage state SOC, the larger the electric storage amount of the electric storage device 40. The sports travel switch is operated by the driver to turn on/off a sport travel mode.

The ECU 50 controls a throttle device of the engine 4 based on the accelerator opening degree, the vehicle speed and the like, for example, adjusts the throttle opening degree of an air intake path to adjust an air intake amount, controls a fuel injection amount corresponding to this change and adjusts an amount of mixed air charged in the combustion chamber, thereby controlling the output of the engine 4. The ECU 50 controls an actuator such as a hydraulic pressure control device based on the accelerator opening degree, the vehicle speed and the like, for example, thereby controlling the gear stage (gear ratio) and the like of the transmission 1.

Herein, the transmission 1 may output the rotational power from the engine 4 from the output shaft 15 after changing the speed thereof by any one gear stage of the odd-numbered gear stage group 11 or the even-numbered gear stage group 12. The transmission 1 puts the first engagement device C1 into the engaged state, the second engagement device C2 into the disengaged state, and the switching units 67 and 68 into the neutral position and puts any one of the first-speed gear stage 61 and the third-speed gear stage 63 into an engaged state (state in which the power is transmitted) by the switching unit 66 when changing the speed by any gear stage of the odd-numbered gear stage group 11. In this case, the transmission 1 transmits the power from the engine 4 to the driven wheel 6 through the first engagement device C1, the first input shaft 13, any one gear stage of the odd-numbered gear stage group 11 (first-speed gear stage 61 and third-speed gear stage 63), and the output shaft 15 in this order. In contrast, the transmission 1 puts the first engagement device C1 into the disengaged state, the second engagement device C2 into the engaged state, and the switching units 66 and 68 into the neutral position and puts any one of the second-speed gear stage 62 and the fourth-speed gear stage 64 into an engaged state (state in which the power is transmitted) by the switching unit 67 when changing the speed by any gear stage of the even-numbered gear stage group 12. In this case, the transmission 1 transmits the power from the engine 4 to the driven wheel 6 through the second engagement device C2, the second input shaft 14, any one gear stage of the even-numbered gear stage group 12 (second-speed gear stage 62 and fourth-speed gear stage 64), and the output shaft 15 in this order.

The ECU 50 calculates a target output based on the accelerator opening degree detected by the accelerator opening degree sensor (or the throttle opening degree detected by the throttle opening degree sensor), the vehicle speed detected by the vehicle speed sensor and the like, for example, and calculates a target control amount, for example, target engine torque and a target engine speed which realize the target output with minimum fuel consumption. The ECU 50 controls fuel injection timing of a fuel injection valve, ignition timing of an ignition plug, the throttle opening degree of the throttle device and the like of the engine 4 to control the output taken from the engine 4, and controls the output of the engine 4 such that engine torque of the engine 4 reaches the target engine torque and the engine speed thereof reaches the target engine speed. The ECU 50 may also control each unit of the transmission 1 to control the gear stage based on the accelerator opening degree detected by the accelerator opening degree sensor, the vehicle speed detected by the vehicle speed sensor and the like, for example. In this case, the ECU 50 executes gear shift control of the transmission 1 based on a gear shift map and the like in which a plurality of gear shift lines and the like is defined according to the accelerator opening degree and the vehicle speed, for example.

The ECU 50 of this embodiment may execute travel starting control to allow the vehicle 2 to start by controlling the engine 4, the first engagement device C1, the second engagement device C2, and the rotational machine 30.

Herein, the transmission 1 of this embodiment engages the engagement device of the shaft on which the starting stage used when the vehicle 2 starts traveling is not provided (that is to say, the input shaft which does not act at the time of the start traveling) out of the first input shaft 13 and the second input shaft 14 to store the energy in a member related to the shaft before the start, for example, in the travel starting control. The transmission 1 may obtain an apparent amplifying effect of the engine torque, for example, by discharging the stored energy as starting energy at the time of the start traveling. That is to say, the transmission 1 typically stores the energy in the input shaft on which the starting stage is not provided before the start and uses the energy at the time of the start traveling to ensure excellent power performance. According to this, the transmission 1 improves the starting performance, improves high-speed fuel consumption performance, downsizes, decreases the load of the engagement device, and improves a lifetime of the engagement device, for example.

Meanwhile, although it is hereinafter described that the starting stage used when the vehicle 2 starts traveling is the first-speed gear stage 61, that is to say, that the odd-numbered gear stage group 11 corresponds to a first gear stage group including the starting stage and the odd-numbered gear stage group 11 includes the first-speed gear stage 61 as the starting stage used when the vehicle 2 starts traveling, there is no limitation. For example, in the transmission 1, there is a case in which the second-speed gear stage 62 is used as the starting stage at the time of the start traveling in a so-called snow mode such as at a snowy road start. In this case, the starting stage used when the vehicle 2 starts traveling is the second-speed gear stage 62; therefore, a relationship between the odd-numbered gear stage group 11 and the even-numbered gear stage group 12 and a relationship between the first gear stage group and the second gear stage group are changed, and a relationship of the input shafts and the engagement devices is also changed according to this. That is to say, in this case, the even-numbered gear stage group 12 corresponds to the first gear stage group including the starting stage and the even-numbered gear stage group 12 includes the second-speed gear stage 62 as the starting stage used when the vehicle 2 starts traveling.

In the following description, in the transmission 1, the first input shaft 13 on which the first-speed gear stage 61 being the starting stage is provided is a starting input shaft and the second input shaft 14 on which the first-speed gear stage 61 being the starting stage is not provided is a non-starting input shaft. The first input shaft 13 being the starting input shaft typically contributes to the transmission of the power from the engine 4 to the driven wheel 6 when the vehicle 2 starts traveling while the second input shaft 14 being the non-starting input shaft does not essentially contribute to the transmission of the power from the engine 4 to the driven wheel 6 when the vehicle 2 starts traveling. In the transmission 1, the first engagement device C1 is a starting engagement device and the second engagement device C2 is a non-starting engagement device. Meanwhile, when the second-speed gear stage 62 is used as the starting stage as described above, the starting input shaft and the starting engagement device are the second input shaft 14 and the second engagement device C2, respectively, and the non-starting input shaft and the non-starting engagement device are the first input shaft 13 and the first engagement device C1, respectively.

Specifically, the ECU 50 starts the vehicle 2 by putting the second engagement device C2 into the engaged state in a state in which the engine 4 operates before the vehicle 2 starts traveling, then putting the second engagement device C2 into the disengaged state, thereafter controlling the rotation of the rotational machine 30, and putting the first engagement device C1 into the engaged state when the vehicle 2 starts traveling in the travel starting control.

Herein, a state in which the engine 4 operates typically is a state in which energy of the fuel is converted to the mechanical work to be output as the power by the combustion of the fuel in the combustion chamber and this includes, for example, an idling state.

In the transmission 1, the second engagement device C2 is put into the engaged state while the engine 4 is operating before the vehicle 2 starts traveling in the above-described manner, so that the engine output shaft 4a of the engine 4 is coupled to the second input shaft 14 being the non-starting input shaft through the second engagement device C2. According to this, the second engagement device C2 is put into the engaged state while the engine 4 is operating before the vehicle 2 starts traveling, so that the second input shaft 14 stores the rotational power transmitted from the engine 4 through the second engagement device C2 as the inertia energy (rotational energy). That is to say, in this case, the second input shaft 14 serves as an inertia energy storage body which stores the rotational power transmitted from the engine 4 through the second engagement device C2 as the inertia energy.

Then, in the transmission 1, in the state in which the inertia energy is stored in the second input shaft 14, the second engagement device C2 is put into the disengaged state, thereafter the rotation of the rotational machine 30 is controlled, and the first engagement device C1 is put into the engaged state when the vehicle 2 starts traveling as described above. According to this, in the transmission 1, the second input shaft 14 being the non-starting input shaft is released from the engine output shaft 4a of the engine 4 and the engine output shaft 4a of the engine 4 is coupled to the first input shaft 13 being the starting input shaft through the first engagement device C1. According to this, the rotational power is transmitted from the engine 4 to the first input shaft 13 through the first engagement device C1 and the first input shaft 13 is rotationally driven by the rotational power from the engine 4. Furthermore, the second input shaft 14 discharges the stored inertia energy to the first input shaft 13 through the differential mechanism 20 as the rotational power used for starting the vehicle 2 in accordance with rotational control of the rotational machine 30. According to this, the rotational power is transmitted from the second input shaft 14 to the first input shaft 13 through the differential mechanism 20, and the first input shaft 13 is rotationally driven also by the rotational power transmitted from the second input shaft 14 through the differential mechanism 20 in addition to the rotational power from the engine 4.

The power transmitted from the engine 4 and the second input shaft 14 to the first input shaft 13 is transmitted to the driven wheel 6 through the first-speed gear stage 61 being the starting stage, the output shaft 15 and the like. Therefore, the transmission 1 may start the vehicle 2 by using both the power transmitted from the engine 4 to the first input shaft 13 and the power stored in the second input shaft 14 in advance to be transmitted to the first input shaft 13 through the differential mechanism 20 when the vehicle 2 starts traveling.

Herein, the energy storage in the second input shaft 14 before the start and the discharge of the stored energy are described in more detail with specific examples with reference to FIGS. 2, 3, and 4. FIG. 2 is an example of the alignment chart in which a relative relationship among rotational speeds of the rotational elements of the differential mechanism 20 before the vehicle 2 starts traveling after the engine 4 starts is indicated by a straight line. FIG. 3 is an example of the alignment chart in which the relative relationship among the rotational speeds of the rotational elements of the differential mechanism 20 when the vehicle 2 starts traveling is indicated by a straight line. Each of FIGS. 2 and 3 is a speed diagram in which vertical axes are an S axis, a C axis, and an R axis representing the rotational speeds of the sun gear 20S, the carrier 20C, and the ring gear 20R, respectively, and in which the rotational elements are arranged such that intervals therebetween along a horizontal axis are the intervals corresponding to a gear ratio between the sun gear 20S and the ring gear 20R. The sun gear 20S, the carrier 20C, and the ring gear 20R of the differential mechanism 20 operate at the rotational speeds (corresponding to rotational speeds) based on the alignment charts illustrated in FIGS. 2, 3 and the like. Herein, the rotational speed of the sun gear 20S corresponds to the rotational speed according to the rotational speed of the rotational machine 30. The rotational speed of the carrier 20C corresponds to the rotational speed of the first input shaft 13. The rotational speed of the ring gear 20R corresponds to the rotational speed of the second input shaft 14. A gear ratio $\rho$ illustrated in FIGS. 2 and 3 is a gear ratio of the differential mechanism 20. That is to say, when the interval between the sun gear 20S and the carrier 20C is set to "1", the interval between the carrier 20C and the ring gear 20R corresponds to the gear ratio $\rho$. The gear ratio $\rho$ may be represented as "$\rho=Zs/Zr$" when the number of teeth of the sun gear 20S is set to "Zs" and the number of teeth of the ring gear 20R is set to "Zr". In the transmission 1, the gear ratio $\rho$ of the differential mechanism 20 is set such that change in speed of the rotational machine 30 may be appropriately ensured. According to this, the transmission 1 may optimize a size of the rotational machine 30 and inertia mass of the second input shaft 14, thereby improving mountability. Meanwhile, the same applies to the alignment charts described hereinafter unless otherwise noted. In FIG. 4, time is plotted along a horizontal axis and the rotational speed is plotted along a vertical axis. In FIG. 4, dotted line L11, solid line L12, and dashed-dotted line L13 indicate the engine speed, the first input shaft rotational speed, and the rotational machine rotational speed, respectively.

When the inertia energy is stored in the second input shaft 14 before the vehicle 2 starts traveling, the ECU 50 first puts the first-speed gear stage 61 being the starting stage into the engaged state (state in which the power is transmitted) by the switching unit 66 and puts other gear stages into the disengaged state (state in which the power is not transmitted), thereby making a state in which the first-speed gear stage 61 is selected as the starting stage in the state in which the vehicle 2 stops. Meanwhile, at that time, the ECU 50 controls a brake device of the vehicle 2 to make a braked state and stops the rotation of the first input shaft 13, for example. Then, the ECU 50 starts the engine 4 to put the engine 4 into the operating state, for example, the idling state, and makes an engine speed Ne constant. At that time, the ECU 50 puts both the first engagement device C1 and the second engagement device C2 into the disengaged state.

The ECU 50 puts the second engagement device C2 into the engaged state while the engine 4 is operating. According to this, in the transmission 1, the rotational speed of the ring gear 20R and the second input shaft 14 increases to be synchronized with (become equivalent to) the engine speed Ne while the rotational speed of the sun gear 20S and the rotational machine 30 increases in a direction opposite to that of the ring gear 20R and the second input shaft 14 in a state in which the rotation of the carrier 20C and the first input shaft 13 is stopped as illustrated in FIG. 2. As a result, the transmission 1 may store the rotational power transmitted from the engine 4 to the second input shaft 14 through the second engagement device C2 in the second input shaft 14 as the inertia energy.

Then, the ECU 50 puts the second engagement device C2 into the disengaged state, thereafter controls the rotation of the rotational machine 30 to adjust differential rotation of the differential mechanism 20, and puts the first engagement device C1 into the engaged state when the vehicle 2 starts traveling. At that time, the ECU 50 of this embodiment controls the rotational machine 30 and generates electric power by the rotational machine 30. In other words, the ECU 50 generates electric power by the rotational machine 30 by using the rotational power transmitted from the second input shaft 14 to the rotational machine 30 through the differential mechanism 20 and stores the generated electric energy in the electric storage device 40 when putting the second engagement device C2 into the disengaged state, thereafter controlling the rotation of the rotational machine 30, and putting the first engagement device C1 into the engaged state when the vehicle 2 starts traveling.

According to this, in the transmission 1, the differential state of the differential mechanism 20 shifts from a state indicated by a dotted line to a state indicated by a solid line as illustrated in FIG. 3. That is to say, in the transmission 1, the rotational speed of the sun gear 20S and the rotational machine 30 decreases toward 0 (also refer to dashed dotted line L13 in FIG. 4) and at the same time, the inertia energy of the ring gear 20R and the second input shaft 14 is discharged to the carrier 20C and the first input shaft 13 and the rotational speed of the carrier 20C and the first input shaft 13 (refer to solid line L12 in FIG. 4) increase so as to converge to the engine speed (refer to dotted line L11 in FIG. 4).

At that time, the torque input from the second input shaft 14 to the carrier 20C and the first input shaft 13 through the differential mechanism 20 is amplified by $[1+(1/\rho)]$ times according to the gear ratio $\rho$ of the differential mechanism 20 to be transmitted. The torque of the sun gear 20S at that time (hereinafter, sometimes also referred to as "sun gear torque Fs"), the torque input to the carrier 20C and the first input shaft 13 (hereinafter, sometimes also referred to as "carrier torque Fc"), the torque of the ring gear 20R and the second input shaft 14 (hereinafter, sometimes also referred to as "ring gear torque Fr") may be represented by following equations (1), (2), and (3) by using MG control torque (MG output torque) Fo of the rotational machine 30. The MG control torque Fo of the rotational machine 30 is absorption torque at the time of power generation in other words, and typically is the torque to decrease an MG rotational speed.

$$Fs = Fo \quad (1)$$

$$Fc = Fo \cdot (1 + 1/\rho) \quad (2)$$

$$Fr = Fo/\rho \quad (3)$$

In this manner, the transmission 1 may transmit the torque amplified by $[1+(1/\rho)]$ times to the first-speed gear stage 61 being the starting stage through the differential mechanism 20, the first input shaft 13 and the like by applying the MG control torque Fo by the power generation of the rotational machine 30 when discharging the inertia energy stored in the second input shaft 14 to the first input shaft 13 as the rotational power. That is to say, in addition to simply using the energy stored in the second input shaft 14 as the starting energy, the transmission 1 may obtain an action to amplify the torque by the differential mechanism 20 and the like to transmit to the first input shaft 13 when discharging the stored energy, that is to say, a torque amplifying action.

More specifically, the ECU 50 converts a part of the inertia energy stored in the second input shaft 14 to the electric energy by the rotational machine 30 by the rotational control of the rotational machine 30 and discharges the rest of the inertia energy stored in the second input shaft 14 to the first input shaft 13 as driving energy for starting when discharging the inertia energy stored in the second input shaft 14. At that time, the ECU 50 may adjust a distribution ratio of the inertia energy stored in the second input shaft 14, that is to say, a ratio between the energy converted to the electric energy by the rotational machine 30 and the energy discharged to the first input shaft 13 to be used as the driving energy for starting by adjusting a power generation amount by the rotational machine 30. According to this, the ECU 50 may adjust an increase amount of starting torque (amplified amount of torque) by discharging the energy from the second input shaft 14 to the first input shaft 13 according to the power generation amount by the rotational machine 30, in other words, the absorption torque by the rotational machine 30.

That is to say, in the transmission 1, the torque obtained by summing up engine torque Fe input from the engine 4 to the first input shaft 13 being the starting input shaft through the first engagement device C1 and the carrier torque Fc input after being amplified from the second input shaft 14 through the differential mechanism 20 in the above-described manner acts as starting input shaft torque F1 at the time of the start traveling by the above-described travel starting control. The carrier torque Fc may be made variable according to the MG control torque Fo of the rotational machine 30 as described above.

Therefore, the ECU 50 may adjust the torque amplifying action when discharging the inertia energy from the second input shaft 14 by adjusting the carrier torque Fc by adjusting the MG control torque Fo by performing the rotational control of the rotational machine 30 when discharging the inertia energy from the second input shaft 14. According to this, the ECU 50 may adjust the starting input shaft torque F1 input to the first input shaft 13. That is to say, the ECU 50 may adjust the torque property in the transmission 1 by controlling the rotation of the rotational machine 30, and for example, adjust the torque ratio when discharging the inertia energy from the second input shaft 14 when the vehicle 2 starts traveling.

As a result, the transmission 1 may start the vehicle 2 by the starting input shaft torque F1 apparently amplified by the carrier torque Fc from the second input shaft 14 in addition to the engine torque Fe from the engine 4. That is to say, the transmission 1 may start the vehicle 2 by using both the power transmitted from the engine 4 to the first input shaft 13 and the power stored in advance in the second input shaft 14 to be amplified through the differential mechanism 20. At that time, the transmission 1 may make the torque property in the transmission 1 (for example, torque ratio), and further power performance at the time of the start traveling variable by adjusting the amplified power from the second input shaft 14 through the differential mechanism 20 by the rotational control of the rotational machine 30.

FIG. 5 is the diagram illustrating an example of the torque property in the transmission 1. In FIG. 5, a speed ratio is plotted along a horizontal axis and the torque ratio of the transmission 1 and apparent efficiency of the transmission 1 are plotted along a vertical axis. The speed ratio herein corresponds to "first input shaft rotational speed/engine speed]. In FIG. 5, a speed ratio $\alpha$ indicates a clutch point at which torque ratio=1 is satisfied and a torque ratio T0 indicates a maximum torque ratio, in other words, the torque ratio when speed ratio=0 is satisfied. In FIG. 5, torque Fc1 typically corresponds to apparent engine torque Fei (Fei=Fe×$\alpha$) at speed ratio=1 through the first engagement device C1. The torque Fc corresponds to the above-described carrier torque. The transmission 1 may realize the torque property illustrated in FIG. 5, for example, by controlling the rotational machine 30 to control the MG control torque Fo as described above when discharging the energy stored in the second input shaft 14 when the vehicle 2 starts traveling. According to this, the transmission 1 may arbitrarily optimize the torque property as needed and may easily realize a property approximated to that of an AT torque converter, for example.

Next, an example of the travel starting control by the ECU 50 is described with reference to the flowchart in FIG. 6.

First, the ECU 50 starts the engine 4 (step ST1) and holds the engine 4 in the idling state (step ST2).

Next, the ECU 50 grasps the state of the engine 4 based on the detection result by the vehicle state detection device 51 (step ST3).

Next, the ECU 50 puts the second engagement device C2 into the engaged state (on) (step ST4).

Next, the ECU 50 determines whether the accelerator operation is turned on and a starting request is issued based on the detection result by the vehicle state detection device 51 (step ST5). When the ECU 50 determines that the accelerator operation is not turned on (No at step ST5), that is to say, determines that the starting request is not issued, this shifts the procedure to step ST3 and repeatedly executes following processes.

When the ECU 50 determines that the accelerator operation is turned on (Yes at step ST5), that is to say, determines that the starting request is issued, this reads the accelerator opening degree (or throttle opening degree) based on the detection result by the vehicle state detection device 51 to determine a target meeting rotational speed and controls the engine 4 such that the engine speed is maintained at the target meeting rotational speed (step ST6). Herein, the target meeting rotational speed is the rotational speed determined according to the accelerator opening degree (or throttle opening degree), for example, and typically corresponds to a target first input shaft rotational speed (or engine speed) when the first engagement device C1 is fully engaged. The target meeting rotational speed is set to be larger as the accelerator opening degree becomes larger based on a map, an equation model and the like, for example.

Next, the ECU 50 determines whether the second input shaft rotational speed of the second input shaft 14 is equivalent to the target meeting rotational speed determined at step ST6, in other words, determines whether the second input shaft rotational speed is equivalent to the engine speed based on the detection result by the vehicle state detection device 51 (step ST7). When the ECU 50 determines that the second input shaft rotational speed is not equivalent to the target meeting rotational speed (engine speed) (No at step ST7), this repeatedly executes the determination until they become equivalent to each other.

When the ECU 50 determines that the second input shaft rotational speed becomes equivalent to the target meeting rotational speed (engine speed) (Yes at step ST7), this puts the second engagement device C2 into the disengaged state (off) (step ST8).

Next, the ECU 50 starts engaging the first engagement device C1 while controlling the engine 4 to maintain the engine speed at the meeting rotational speed (step ST9). The ECU 50 controls the engine speed at a clutch meeting rotational speed and maintains the engine speed while increasing the engine torque such that the engine speed does not decrease.

Next, the ECU 50 grasps the state of the engine 4 based on the detection result by the vehicle state detection device 51 (step ST10). Herein, the ECU 50 calculates the engine torque Fe of the engine 4 based on the throttle opening degree, the engine speed and the like.

Next, the ECU 50 calculates a current torque ratio T in the transmission 1 based on the detection result by the vehicle state detection device 51 (step ST11). The ECU 50 measures the first input shaft rotational speed of the first input shaft 13, calculates a speed ratio S (S=first input shaft rotational speed/engine speed) based on the first input shaft rotational speed and the engine speed, and calculates the current torque ratio T in the transmission 1 based on the speed ratio S, for example. The ECU 50 may calculate the torque ratio T by following equation (4), for example, when the speed ratio S is smaller than the speed ratio α according to the clutch point set in advance (for example, refer to FIG. 5). The ECU 50 may calculate the torque ratio T by following equation (5), for example, when the speed ratio S is not smaller than the speed ratio α according to the clutch point. In equation (4), "T0" represents the maximum torque ratio set in advance, in other words, the torque ratio when speed ratio=0 is satisfied (for example, refer to FIG. 5).

$$T=((T0-1)\cdot S/\alpha)+1 \qquad (4)$$

$$T=1 \qquad (5)$$

Next, the ECU 50 calculates the MG control torque (MG output torque) Fo and controls the output of the rotational machine 30 based on the calculated MG control torque Fo (step ST12). The ECU 50 may calculate the apparent engine torque Fei by using following equation (6) and calculate the MG control torque Fo based on the engine torque Fe calculated at step ST10, the torque ratio T calculated at step ST11 and the like, for example. In equation (6), "α" represents a predetermined coefficient and typically, α≠0 is satisfied.

$$Fei=Fe\times\alpha,\ Fo=Fei\cdot(T-1) \qquad (6)$$

Next, the ECU 50 determines whether an absolute value of difference between the engine speed Ne and a first input shaft rotational speed N1 is smaller than a starting slip amount monitoring value B set in advance based on the detection result by the vehicle state detection device 51 (step ST13). Herein, the starting slip amount monitoring value B is a value set in advance according to actual vehicle estimation and the like, for example, the value for determining whether the first engagement device C1 is fully engaged. When the absolute value of the difference between the engine speed Ne and the first input shaft rotational speed N1 is smaller than the starting slip amount monitoring value B, it may be determined that the first engagement device C1 does not slip, that is to say, this is fully engaged.

When the ECU 50 determines that the absolute value of the difference between the engine speed Ne and the first input shaft rotational speed N1 is not smaller than the starting slip amount monitoring value B (No at step ST13), that is to say, when this determines that the first engagement device C1 is not fully engaged, this shifts the procedure to step ST9 and repeatedly executes following processes.

When the ECU 50 determines that the absolute value of the difference between the engine speed Ne and the first input shaft rotational speed N1 is smaller than the starting slip amount monitoring value B (Yes at step ST13), that is to say, when this determines that full engagement of the first engagement device C1 is completed, this finishes the travel starting control to shift to a normal travel mode.

FIG. 7 is the diagram illustrating the starting performance of the vehicle 2 when the above-described travel starting control is performed. In FIG. 7, time is plotted along a horizontal axis and the rotational speed and the torque are plotted along a vertical axis. In FIG. 7, dotted line L21 indicates the engine speed, solid line L22 indicates the first input shaft rotational speed, dotted line L23 indicates the engine torque (for driving vehicle), and solid line L24 indicates the input torque to the first-speed gear stage 61.

In the transmission 1, in a period T1 from the start of the engine 4 to starting time t11, the first engagement device C1 and the second engagement device C2 are put into the disengaged state, so that the rotational power transmitted from the engine 4 to the second input shaft 14 through the second engagement device C2 is stored in the second input shaft 14 as the inertia energy. In the transmission 1, when it actually starts at time t11, the second engagement device C2 is put into the disengaged state and the first engagement device C1 is put into the engaged state, and further the rotational control of the rotational machine 30 is executed. According to this, in the transmission 1, in a period T2 after time t11, the first input shaft rotational speed (solid line L22) converges to the engine speed (dotted line L21) and the energy stored in the second input shaft 14 is discharged to the first input shaft 13 through the differential mechanism 20 and the like, so that the input torque to the first-speed gear stage 61 (solid line L24) is amplified with respect to the engine torque (dotted line L23). The input torque to the first-speed gear stage 61 at the time corresponds to the above-described starting input shaft torque F1 and is the torque obtained by summing up the torque corresponding to the engine torque Fe and the torque corresponding to the carrier torque Fc input from the second input shaft 14 through the differential mechanism 20. According to this, the transmission 1 may start the vehicle 2 by using both the power transmitted from the engine 4 to the first input shaft 13 and the power stored in the second input shaft 14 in advance to be amplified through the differential mechanism 20. In the transmission 1, when the discharge of the energy stored in the second input shaft 14 is completed at time t12, for example, the first input shaft rotational speed converges to the engine speed and the input torque to the first-speed gear stage 61 converges to the engine torque in a period T3 that follows, and it shifts to the normal travel state using any one gear stage of the odd-numbered gear stage group 11 and the even-numbered gear stage group 12. Meanwhile, dotted line L25 in FIG. 7 indicates a case in which the power running of the rotational machine 30 is performed to assist in the period T3 after time t12 at which the discharge of the energy stored in the second input shaft 14 is completed as described in the embodiments to be described later.

The transmission 1 configured in the above-described manner may store the rotational power transmitted from the engine 4 in the second input shaft 14 as the inertia energy by putting the second engagement device C2 into the engaged state while the engine 4 is operating before the vehicle 2 starts traveling in the travel starting control. Then, the transmission 1 may start the vehicle 2 by putting the second engagement device C2 into the disengaged state, thereafter controlling the rotation of the rotational machine 30, and putting the first engagement device C1 into the engaged state when the vehicle 2 starts traveling. As a result, the transmission 1 may start the vehicle 2 by amplifying the apparent torque by using both the power transmitted from the engine 4 to the first input shaft 13 and the power stored in the second input shaft 14 in advance and is amplified through the differential mechanism 20 to be transmitted to the first input shaft 13. At that time, the transmission 1 may control the rotational machine 30 to control the MG control torque Fo, eventually the differential state of the differential mechanism 20, thereby adjusting the amplified power from the second input shaft 14 through the differential mechanism 20 when discharging the energy stored in the second input shaft 14 when the vehicle 2 starts traveling. According to this, the transmission 1 may make the torque performance (torque ratio) in the transmission 1 and further the power performance at the time of the start traveling variable. Therefore, the transmission 1 may improve the starting performance of the vehicle 2. At that time, the ECU 50 may adjust the torque ratio by controlling the rotation of the rotational machine 30 when the vehicle 2 starts traveling, so that the transmission 1 may arbitrarily optimize the torque property as needed.

Furthermore, the power transmitted from the second input shaft 14 to the first input shaft 13 does not pass through the first engagement device C1 while the power transmitted from the engine 4 to the first input shaft 13 passes through the first engagement device C1 when the vehicle 2 starts traveling. Therefore, the transmission 1 may inhibit a transmission amount of the torque through the first engagement device C1 at the time of the start traveling. According to this, the transmission 1 may inhibit thermal loss (slip loss) in the first engagement device C1, for example, while ensuring excellent starting performance, thereby improving fuel consumption performance and improving a lifetime of the first engagement device C1.

The transmission 1 may amplify the apparent torque at the time of the start traveling by the power transmitted from the engine 4 to the first input shaft 13 and the power transmitted from the second input shaft 14 to the first input shaft 13 as described above. According to this, the transmission 1 may set the gear ratio on a higher-speed stage side to the gear ratio more appropriate to high-speed travel, for example, so that this may satisfy both improvement in starting performance and improvement in high-speed fuel consumption performance.

Furthermore, in the transmission 1, the reverse stage 65 is provided on the side of the second input shaft 14 which is the non-starting shaft to serve as the inertia energy storage body at the time of the start traveling, for example. Therefore, the transmission 1 may allow the reverse stage 65 to act as an inertia mass body, that is to say, an inertia mass member for generating inertia moment when storing the rotational power from the engine 4 in the second input shaft 14 as the inertia energy. That is to say, the reverse stage 65 also serves as the inertia mass body connected to the second input shaft 14. Therefore, since the reverse stage 65 also serves as the inertia energy storage body, the transmission 1 may store more inertia energy. According to this, the transmission 1 may further improve the fuel consumption performance and the starting performance. The transmission 1 may decrease acceleration inertia mass when the starting stage is selected by providing the reverse stage 65 not on the side of the first input shaft 13 being the starting input shaft but on the side of the second input shaft 14, so that this may improve the starting performance in this point also.

The transmission 1 according to the embodiment described above is provided with the transmission mechanism 10, the differential mechanism 20, and the ECU 50. The transmission mechanism 10 includes the first engagement device C1 capable of blocking/allowing the power transmission between the engine 4 which generates the rotational power to allow the vehicle 2 to travel and the first input shaft 13 of the odd-numbered gear stage group 11 and the second engagement device C2 capable of blocking/allowing the power transmission between the engine 4 and the second input shaft 14 of the even-numbered gear stage group 12. The differential mechanism 20 connects the rotational shaft 31 of the rotational machine 30, the first input shaft 13, and the second input shaft 14 so as to be differentially rotatable. The ECU 50 may execute the travel starting control to start the vehicle 2 by controlling the engine 4, the first engagement device C1, the second engagement device C2, and the rotational machine 30. The odd-numbered gear stage group 11 includes the starting stage (first-speed gear stage 61) used when the vehicle 2 starts traveling. The ECU 50 starts the vehicle 2 by putting the second engagement device C2 into the engaged state while the engine 4 is operating before the vehicle 2 starts traveling, then putting the second engagement device C2 into the disengaged state, thereafter controlling the rotation of the rotational machine 30, and putting the first engagement device C1 into the engaged state when the vehicle 2 starts traveling in the travel starting control. Therefore, the transmission 1 and the ECU 50 may start the vehicle 2 by using both the power transmitted from the engine 4 to the first input shaft 13 and the power stored in the second input shaft 14 in advance to be transmitted to the first input shaft 13 through the differential mechanism 20, so that they may improve the starting performance.

[Second Embodiment]

Figure 8:
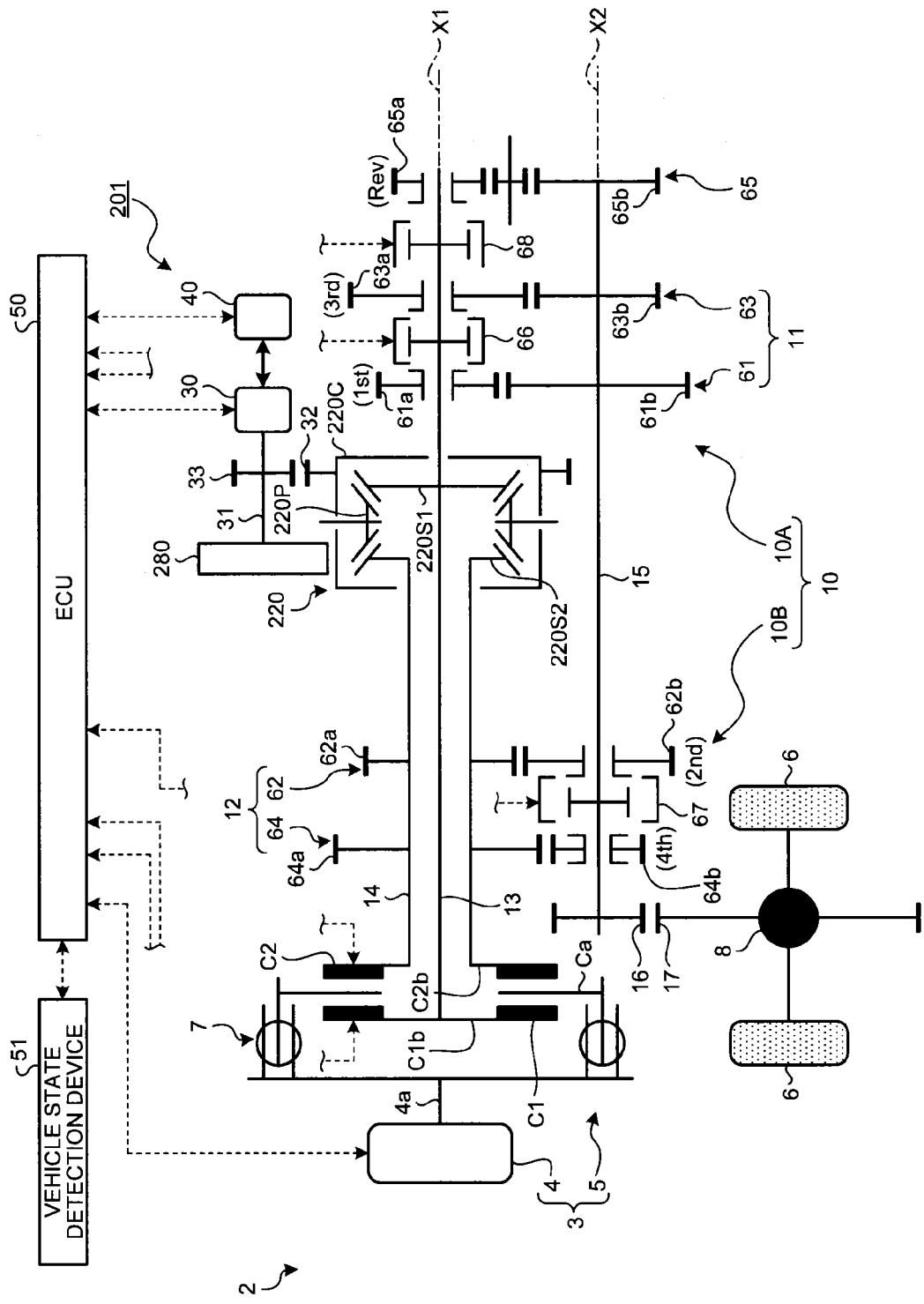
FIG. 8 is a schematic configuration diagram of a vehicle on which a transmission according to a second embodiment is mounted.
Figure 9:
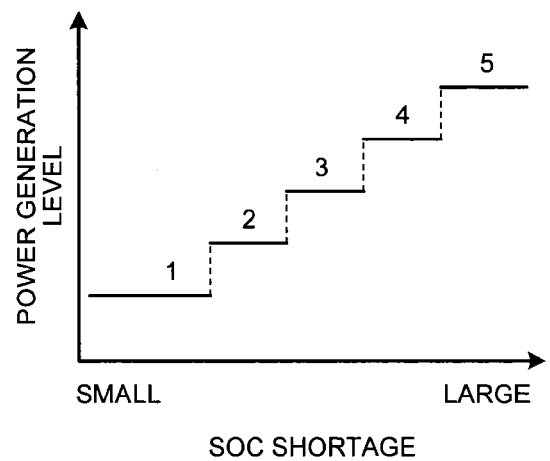
FIG. 9 is a diagram illustrating an example of a power generation level map of the transmission according to the second embodiment.
Figure 10:
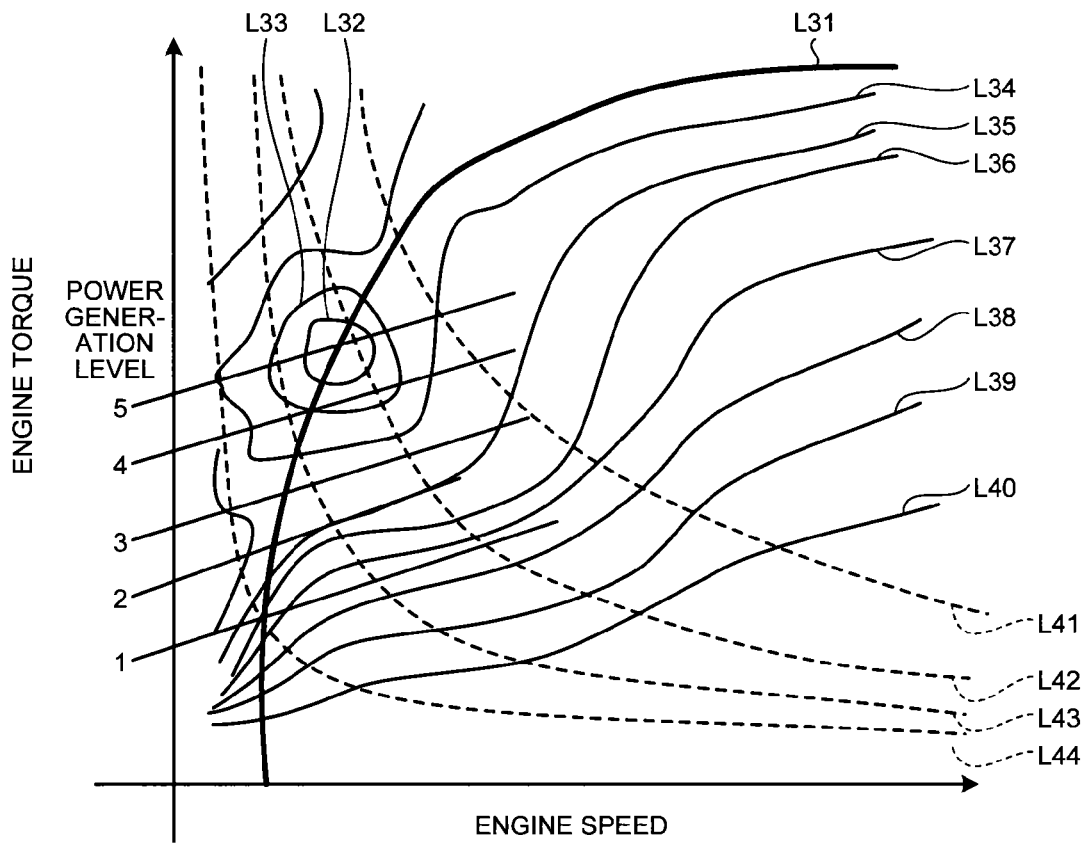
FIG. 10 is a diagram illustrating an example of an output control map of the transmission according to the second embodiment.
Figure 11:
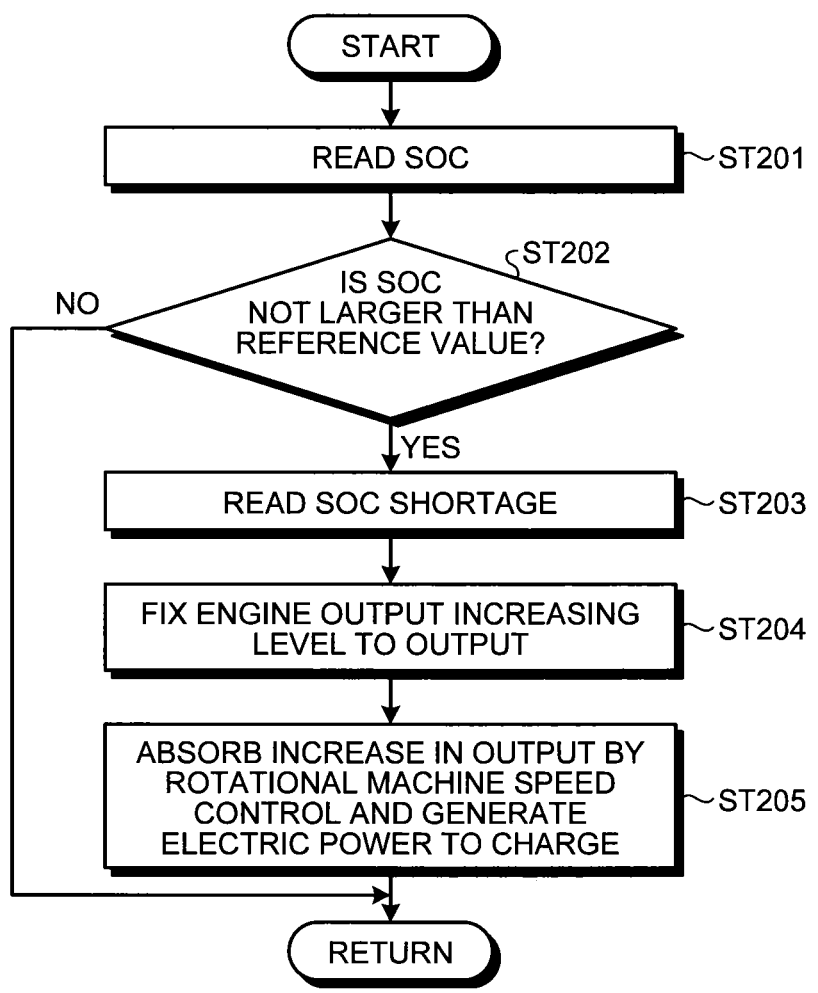
FIG. 11 is a flowchart illustrating an example of control of the transmission according to the second embodiment.

FIG. 8 is a schematic configuration diagram of a vehicle on which a transmission according to a second embodiment is mounted. FIG. 9 is a diagram illustrating an example of a power generation level map of the transmission according to the second embodiment. FIG. 10 is a diagram illustrating an example of an output control map of the transmission according to the second embodiment. FIG. 11 is a flowchart illustrating an example of control of the transmission according to the second embodiment. A transmission for vehicle and a control device according to the second embodiment are different from those of the first embodiment in that they generate electric power by a rotational machine before the vehicle starts traveling. As for a configuration, an action, and an effect common to those of the above-described embodiment, description is not repeated as far as possible (the same applies to embodiments to be described hereinafter).

A transmission 201 as the transmission for vehicle according to this embodiment illustrated in FIG. 8 generates electric power by a rotational machine 30 also before a vehicle 2 starts traveling.

Herein, the transmission 201 of this embodiment is different from the above-described transmission 1 (refer to FIG. 1) in arranging position of an odd-numbered gear stage group 11 as a first gear stage group and an even-numbered gear stage group 12 as a second gear stage group and a configuration of a differential mechanism 220.

An odd-numbered stage transmission unit 10A of this embodiment includes a reverse stage 65 for rearward movement, switching units 66 and 68 and the like in addition to the odd-numbered gear stage group 11. The even-numbered stage transmission unit 10B includes a switching unit 67 and the like in addition to the even-numbered gear stage group 12. In this embodiment, a first input shaft 13 is formed into a columnar shape. The first input shaft 13 is inserted into a second input shaft 14 formed into a cylindrical shape.

A first engagement device C1 is provided on the first input shaft 13 at the end on an engine 4 side. An end opposite to an engine 4 of the first input shaft 13, that is to say, the end opposite to the first engagement device C1 protrudes from the second input shaft 14 so as to be exposed. On the first input shaft 13, the first engagement device C1, the differential mechanism 220, a drive gear 61a, the switching unit 66, a drive gear 63a, the switching unit 68, and a drive gear 65a are arranged in this order from the engine 4 side. On the first input shaft 13, the differential mechanism 220, the drive gear 61a, the switching unit 66, the drive gear 63a, the switching unit 68, and the drive gear 65a are provided in a portion exposed from the second input shaft 14. The second engagement device C2 is provided on the second input shaft 14 at the end on the engine 4 side. An end opposite to the engine 4 of the second input shaft 14, that is to say, the end opposite to the second engagement device C2 is connected to the differential mechanism 220. On the second input shaft 14, the second engagement device C2, a drive gear 64a, and a drive gear 62a are arranged in this order from the engine 4 side.

A drive gear 16 is coupled to an output shaft 15 at the end on the engine 4 side so as to be integrally rotatable and a driven gear 65b is coupled thereto at the other end so as to be integrally rotatable. On the output shaft 15, the drive gear 16, a driven gear 64b, the switching unit 67, a driven gear 62b, a driven gear 61b, a driven gear 63b, and the driven gear 65b are arranged in this order from the engine 4 side.

As for gear stages of the above-described odd-numbered gear stage group 11, the drive gears 61a and 63a are supported on the first input shaft 13 through a bush and the like so as to be relatively rotatable and the driven gears 61b and 63b are coupled to the output shaft 15 so as to be integrally rotatable. As for the reverse stage 65, the drive gear 65a is supported on the first input shaft 13 through a bush and the like so as to be relatively rotatable and the driven gear 65b is coupled to the output shaft 15 so as to be integrally rotatable. As for the gear stages of the even-numbered gear stage group 12, the drive gears 62a and 64a are coupled to the second input shaft 14 so as to be integrally rotatable and the driven gears 62b and 64b are supported on the output shaft 15 through a bush and the like so as to be relatively rotatable. Herein, as a transmission mechanism 10, an even-numbered stage transmission unit 10B is arranged on the engine 4 side and the odd-numbered stage transmission unit 10A is arranged on the other side across the differential mechanism 220 arranged coaxially with a rotational axis X1.

In the switching unit 66 of this embodiment, when an engaging member is located on a drive gear 61a side, the drive gear 61a is coupled to the first input shaft 13 and the drive gear 63a is released from the first input shaft 13 to be put into an idling state. Similarly, in the switching unit 66, when an engaging member is located on a drive gear 63a side, the drive gear 63a is coupled to the first input shaft 13 and the drive gear 61a is released from the first input shaft 13 to be put into an idling state. In the switching unit 68, when an engaging member is located on a drive gear 65a side, the drive gear 65a is coupled to the first input shaft 13.

The differential mechanism 220 of this embodiment is formed of a so-called differential gear. Herein, the differential mechanism 220 includes a first sun gear 220S1, a second sun gear 220S2, and a carrier 220C as a plurality of rotational elements capable of differentially rotating relative to one another. The first sun gear 220S1 and the second sun gear 220S2 are external tooth gears. The carrier 220C holds a plurality of pinion gears 2202 meshing with both the first sun gear 220S1 and the second sun gear 220S2 so as to be rotatable and revolvable.

In the differential mechanism 220 of this embodiment, the first sun gear 220S1 is the element connected to the first input shaft 13, the second sun gear 220S2 is the element connected to the second input shaft 14, and the carrier 220C is the element connected to a rotational shaft 31. The first sun gear 220S1 is formed into a disk shape to be coupled to the first input shaft 13 so as to be integrally rotatable. The second sun gear 220S2 is formed into an annular shape to be coupled to the second input shaft 14 so as to be integrally rotatable. The carrier 220C is formed into an annular plate shape to hold the pinion gear 2202 being the external tooth gear on a pinion shaft so as to be rotatable and revolvable. The rotational shaft 31 of the rotational machine 30 is connected to the carrier 220C through the gears 32, 33 and the like. The gear 32 is coupled to the carrier 220C so as to be integrally rotatable. The gear 33 is coupled to the rotational shaft 31 so as to be integrally rotatable to mesh with the gear 32. A gear ratio $\rho$ of the differential mechanism 220 may be represented as "$\rho = Zs1/Zs2$" when the number of teeth of the first sun gear 220S1 is set to "$Zs1$" and the number of teeth of the second sun gear 220S2 is set to "$Zs2$". In the transmission 201, the gear ratio $\rho$ of the differential mechanism 220 is set such that change in speed of the rotational machine 30 may be appropriately ensured as in the case of the above-described transmission 1 (refer to FIG. 1). The gear ratio ρ of the differential mechanism 220 formed of the differential gear is set to satisfy ρ=1, for example.

Meanwhile, the transmission 201 according to this embodiment is further provided with a rotational body 280 as an inertia mass body. The rotational body 280 is connected to the rotational shaft 31 of the rotational machine 30. The rotational body 280 being a fly wheel formed into a disk shape, for example, acts as an inertia mass member for generating inertia moment. Although the rotational body 280 is herein coupled to the rotational shaft 31 so as to be integrally rotatable, this may also be connected to the rotational shaft 31 through a gear and the like.

An ECU 50 of this embodiment generates electric power by the rotational machine 30 by using rotational power transmitted from the engine 4 to the rotational machine 30 through the second engagement device C2, the second input shaft 14, and the differential mechanism 220 and stores generated electric energy in an electric storage device 40 by putting the second engagement device C2 into an engaged state in a state in which the engine 4 operates before the vehicle 2 starts traveling. That is to say, in this case, the electric storage device 40 serves as an electric energy storage body which stores the rotational power transmitted from the engine 4 through the second engagement device C2 as the electric energy. In this case, when storing inertia energy in the second input shaft 14 before the vehicle 2 starts traveling, the ECU 50 first puts a first-speed gear stage 61 being a starting stage into an engaged state (state in which the power is transmitted) by the switching unit 66 and puts other gear stages into a disengaged state (state in which the power is not transmitted), thereby making a state in which the first-speed gear stage 61 is selected as the starting stage in a state in which the vehicle 2 stops. Then, the ECU 50 controls a brake device of the vehicle 2 to make a braked state and stops rotation of the first input shaft 13, for example.

The ECU 50 grasps an electric storage state SOC of the electric storage device 40 based on a detection result by a vehicle state detection device 51 before the vehicle 2 starts traveling, for example, and increases an output of the engine 4 in a case in which an electric storage amount of the electric storage device 40 is not larger than a reference value set in advance. Then, the ECU 50 generates electric power by the rotational machine 30 by using the rotational power transmitted from the engine 4 to the rotational machine 30 through the second input shaft 14 being a non-starting shaft, the differential mechanism 220 and the like to store in the electric storage device 40. Herein, the reference value is a value set in advance according to specification and the like of the electric storage device 40, for example, and is typically set to a value capable of preventing over discharge of the electric storage device 40.

The ECU 50 sets a power generation level based on the power generation level map illustrated in FIG. 9 (or equation model corresponding to this), for example. In the power generation level map illustrated in FIG. 9, SOC shortage and the power generation level are plotted along a horizontal axis and a vertical axis, respectively. The power generation level map describes a relationship between the SOC shortage and the power generation level. The power generation level map is stored in advance in a storage unit of the ECU 50 as a map in which a relationship between the SOC shortage and a required power generation level is set in advance based on actual vehicle estimation and the like. In the power generation level map, the power generation level becomes higher by one stage as the SOC shortage becomes larger by a predetermined amount. The ECU 50 calculates the SOC shortage with respect to an appropriate electric storage amount according to the electric storage state SOC of the electric storage device 40 based on the detection result by the vehicle state detection device 51. Then, the ECU 50 sets the power generation level from the SOC shortage based on the above-described power generation level map. Meanwhile, the power generation level map in FIG. 9 is merely an example and the map is not limited thereto.

The ECU 50 increases the output of the engine 4 according to the power generation level set in the above-described manner and generates electric power by the rotational machine 30 to store in the electric storage device 40. The ECU 50 sets output control of the engine 4 based on an output control map illustrated in FIG. 10 (or equation model corresponding to this), for example. In the output control map illustrated in FIG. 10, an engine speed and engine torque are plotted along a horizontal axis and a vertical axis, respectively. The output control map describes a relationship among the engine speed, the engine torque, and the power generation level. The output control map is stored in advance in the storage unit of the ECU 50 as a three-dimensional map in which the relationship among the engine speed, the engine torque, and the power generation level is set in advance based on the actual vehicle estimation and the like.

Herein, in FIG. 10, solid line L31 indicates an optimal fuel consumption line. The optimal fuel consumption line L31 is aggregation of operation points of the engine 4 at which the engine 4 may be operated with optimal fuel consumption (efficiently). Herein, the operation point of the engine 4 is determined according to the engine torque (engine torque) output by the engine 4 and the engine speed (engine speed). The optimal fuel consumption line L31 indicates the relationship between the engine torque and the engine speed with which the engine 4 may be operated with the most excellent fuel consumption, that is to say, with the most excellent engine efficiency (engine efficiency). Herein, the fuel consumption is intended to mean a fuel consumption amount per unit workload and this corresponds to a fuel amount required for the vehicle 2 to travel a unit distance or the distance the vehicle 2 may travel per unit fuel amount. That is to say, the optimal fuel consumption line L31 is set based on the engine speed and the engine torque with which the engine 4 may be operated with higher priority on the distance the vehicle 2 on which the engine 4 is mounted may travel per unit fuel amount and is determined in advance according to an output property of the engine 4. Solid lines L32 to L40 indicate equivalent fuel consumption efficiency lines (for example, equivalent fuel consumption rate curves). Each of the equivalent fuel consumption efficiency lines L32 to L40 is aggregation of the operation points of the engine 4 at which the fuel consumption efficiency (for example, fuel consumption rate) of the engine 4 is equivalent. The equivalent fuel consumption efficiency lines L32 to L40 are such that an area enclosed by the equivalent fuel consumption efficiency line L32 is an area in which the fuel consumption efficiency is the highest and the fuel consumption efficiency gradually decreases in a direction toward the equivalent fuel consumption efficiency line L40. Dotted lines L41 to L44 indicate equivalent output (power) lines. Each of the equivalent output lines L41 to L44 is aggregation of the operation points of the engine 4 at which the output of the engine 4 is equivalent. Meanwhile, the optimal fuel consumption line L31, the equivalent fuel consumption efficiency lines L32 to L40, and the equivalent output lines L41 to L44 in FIG. 10 are illustrated as an example.

Then, the ECU 50 controls the output of the engine 4 such that the operation point of the engine 4 is located on the optimal fuel consumption line of the engine 4 based on the above-described output control map and the power generation level set above before the vehicle 2 starts traveling. The ECU 50 controls the output of the engine 4 by making the operation point located at an intersection between the set power generation level and the optimal fuel consumption line L31 a target to control the engine torque and the engine speed. According to this, the transmission 201 may increase the output of the engine 4 and generate electric power by the rotational machine 30 to store in the electric storage device 40 such that the power generation level corresponding to the SOC shortage is realized while operating the engine 4 on the optimal fuel consumption line.

Next, an example of electric storage control by the ECU 50 is described with reference to the flowchart in FIG. 11.

First, the ECU 50 reads the electric storage state SOC of the electric storage device 40 based on the detection result by the vehicle state detection device 51 before the vehicle 2 starts traveling (step ST201).

Next, the ECU 50 determines whether the electric storage amount (SOC) of the electric storage device 40 is not larger than the reference value set in advance based on the electric storage state SOC read at step ST201 (step ST202). When the ECU 50 determines that the electric storage amount (SOC) is larger than the reference value (No at step ST202), this finishes a current control period and shifts to a next control period.

When the ECU 50 determines that the electric storage amount (SOC) is not larger than the reference value (Yes at step ST202), this reads the SOC shortage with respect to the appropriate electric storage amount of the electric storage device 40 based on the electric storage state SOC read at step ST201 (step ST203).

Next, the ECU 50 fixes an engine output increasing level (increasing level with respect to an idling output, for example) based on the SOC shortage read at step ST203 and controls the output of the engine 4 based on this (step ST204). In this case, the ECU 50 calculates the engine output increasing level based on the SOC shortage, the power generation level map (FIG. 9), the output control map (FIG. 10) and the like as described above, for example.

Next, the ECU 50 absorbs an increase in output of the engine 4 by the rotational machine 30 by rotational machine speed control and generates electric power to charge (store in) the electric storage device 40 (step ST205), then finishes the current control period and shifts to the next control period.

The transmission 201 and the ECU 50 according to the above-described embodiment may start the vehicle 2 by using both the power transmitted from the engine 4 to the first input shaft 13 and the power stored in the second input shaft 14 in advance to be transmitted to the first input shaft 13 through the differential mechanism 220, so that starting performance may be improved.

Furthermore, according to the transmission 201 according to the embodiment described above, the ECU 50 generates electric power by the rotational machine 30 by using the rotational power transmitted from the engine 4 to the rotational machine 30 through the second engagement device C2, the second input shaft 14, and the differential mechanism 220 by putting the second engagement device C2 into the engaged state while the engine 4 is operating before the vehicle 2 starts traveling, and stores the generated electric energy in the electric storage device 40.

Therefore, the transmission 201 and the ECU 50 may generate electric power by the rotational machine 30 by using the rotational power from the engine 4 and store the generated electric energy in the electric storage device 40 while operating the engine 4 in a state with excellent fuel consumption efficiency before the vehicle 2 starts traveling, for example. For example, the transmission 201 and the ECU 50 may adjust a power generation amount by the rotational machine 30 according to the electric storage state SOC of the electric storage device 40 and efficiently ensure electric power by using an area with the high engine efficiency as far as possible when the SOC shortage is large. As a result, the transmission 201 and the ECU 50 may improve fuel consumption performance and eliminate an existing alternator and the like to decrease cost, for example.

[Third Embodiment]

Figure 12:
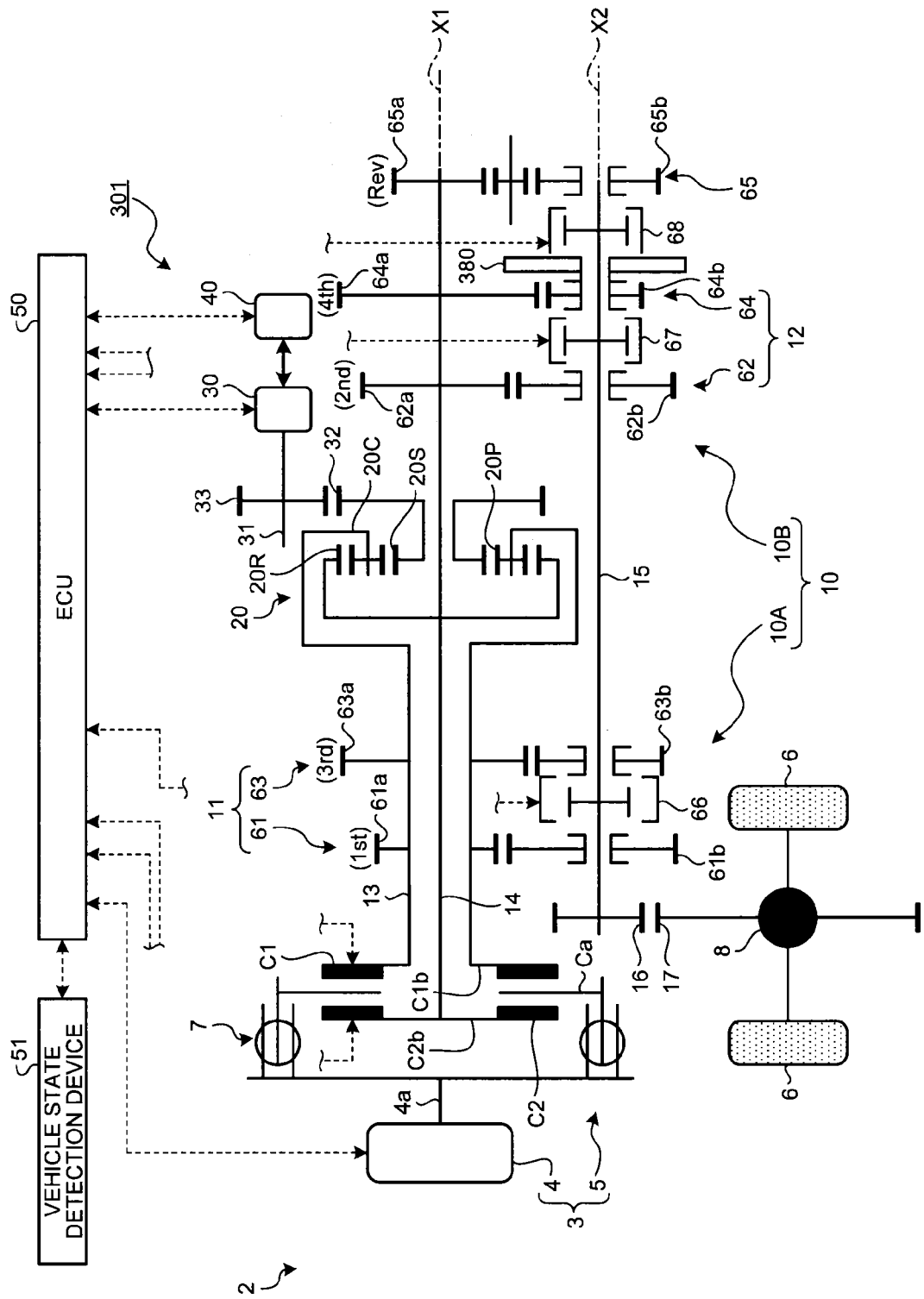
FIG. 12 is a schematic configuration diagram of a vehicle on which a transmission according to a third embodiment is mounted.

FIG. 12 is a schematic configuration diagram of a vehicle on which a transmission according to a third embodiment is mounted. This is a diagram illustrating an example of an operation property of an engine of a power train to which the transmission according to the third embodiment is applied. A transmission for vehicle and a control device according to the third embodiment are different from those of the first and second embodiments in that they are provided with an inertia mass body provided in a predetermined position.

A transmission 301 as the transmission for vehicle according to this embodiment illustrated in FIG. 12 is provided with a rotational body 380 as the inertia mass body connected to a second input shaft 14. The rotational body 380 being a fly wheel formed into an annular plate shape acts as an inertia mass member for generating inertia moment. Although the rotational body 380 of this embodiment is coupled to a driven gear 64b of a fourth-speed gear stage 64 so as to be integrally rotatable, there is no limitation. Herein, the fourth-speed gear stage 64 is the highest-speed gear stage out of a first-speed gear stage 61, a second-speed gear stage 62, a third-speed gear stage 63, and the fourth-speed gear stage 64. Therefore, out of members driven-rotated according to rotation of the second input shaft 14 being a non-starting shaft before a vehicle 2 starts traveling, a rotational speed of the driven gear 64b on a driven side of the fourth-speed gear stage 64 tends to be relatively high. That is to say, in the transmission 301, the rotational body 380 as the inertia mass body is herein provided on the driven gear 64b on the driven side of the fourth-speed gear stage 64 being the highest-speed gear stage selectable in the second input shaft 14 being the non-starting shaft.

In the transmission 301 configured in the above-described manner, the rotational body 380 is provided on a side of the second input shaft 14 being the non-starting shaft and serves as an inertia energy storage body at the time of start, so that the rotational body 380 may also act as the inertia mass body, that is to say, the inertia mass member for generating the inertia moment when rotational power from the engine 4 is stored in the second input shaft 14 as the inertia energy. That is to say, the rotational body 380 also serves as the inertia mass body connected to the second input shaft 14. Therefore, since the rotational body 380 also serves as the inertia energy storage body, the transmission 301 may store more inertia energy. Herein, the rotational body 380 is provided so as to be integrally rotatable with the driven gear 64b on the driven side of the fourth-speed gear stage 64 being the highest-speed gear stage, so that the transmission 301 may store the inertia energy in the rotational body 380 more efficiently. According to this, the transmission 301 may increase energy discharged from the second input shaft 14 to a first input shaft 13 at the time of the start traveling, so that this may further improve fuel consumption performance and starting performance. For example, when a gear ratio (gear ratio) of the fourth-speed gear stage 64 is set to "G4" and inertia mass of the rotational body 380 is set to [Iw], inertia mass Ik expressed in terms of the second input shaft 14 of the rotational body 380 is represented as [$Ik=Iw/G4^2$] and conversion inertia mass becomes larger than that of other gear stages (second-speed gear stage 62 and the like), so that the transmission 301 may make a torque amplifying effect described above relatively large.

The transmission 301 and the ECU 50 according to the above-described embodiment may start the vehicle 2 by using both the power transmitted from the engine 4 to the first input shaft 13 and the power stored in the second input shaft 14 in advance to be transmitted to the first input shaft 13 through a differential mechanism 20, so that the starting performance may be improved.

Furthermore, the transmission 301 according to the embodiment described above is provided with the rotational body 380 connected to the second input shaft 14. Therefore, the transmission 301 and the ECU 50 may store the inertia energy also in the rotational body 380 when storing the rotational power from the engine 4 in the second input shaft 14 as the inertia energy, so that this may further improve the fuel consumption performance and the starting performance.

[Fourth Embodiment]

Figure 13:
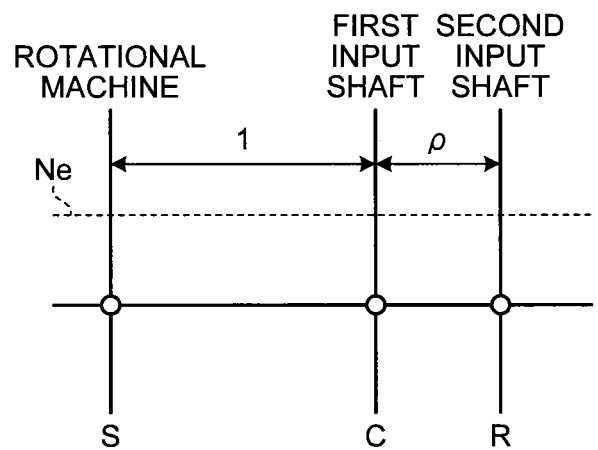
FIG. 13 is an alignment chart illustrating an example of operation of a transmission according to a fourth embodiment.
Figure 14:
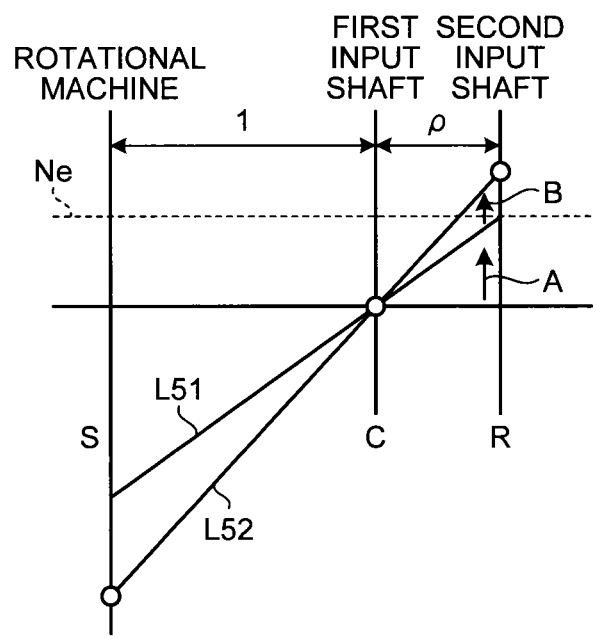
FIG. 14 is an alignment chart illustrating an example of the operation of the transmission according to the fourth embodiment.
Figure 15:
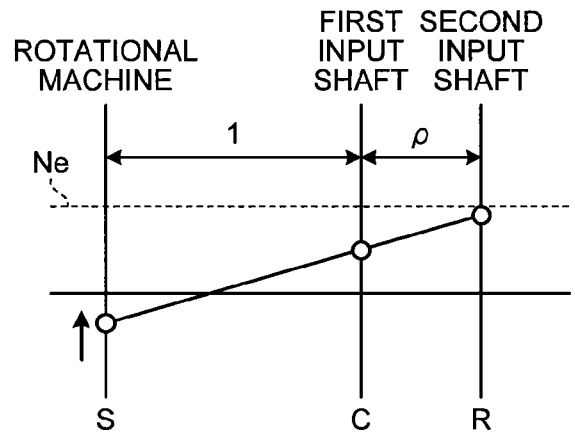
FIG. 15 is an alignment chart illustrating an example of the operation of the transmission according to the fourth embodiment.
Figure 16:
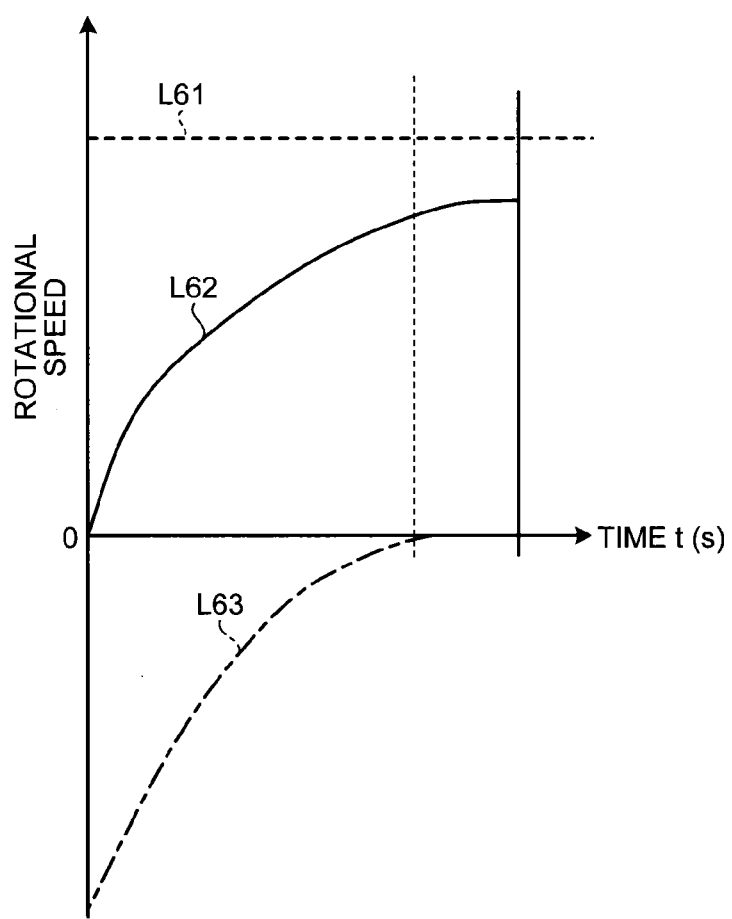
FIG. 16 is a diagram illustrating operation of an engagement device of the transmission according to the fourth embodiment.
Figure 17:
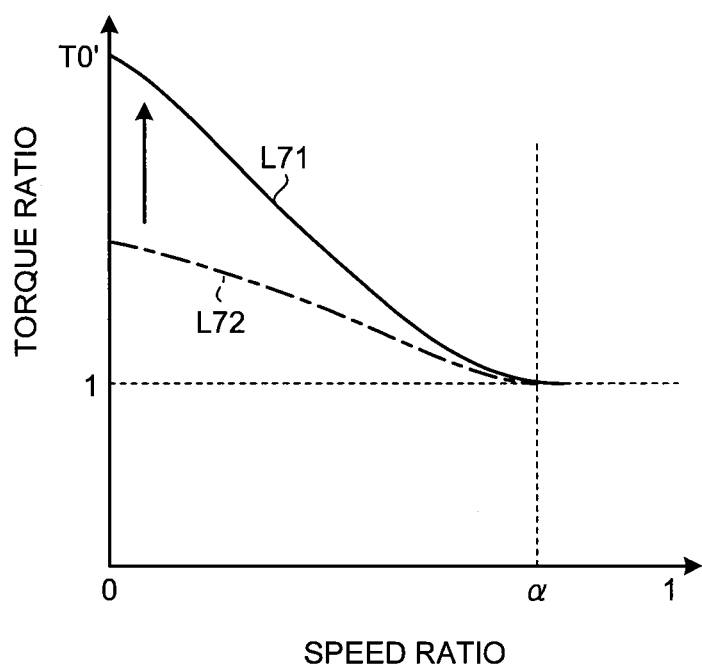
FIG. 17 is a diagram illustrating an example of a torque property of the transmission according to the fourth embodiment.
Figure 18:
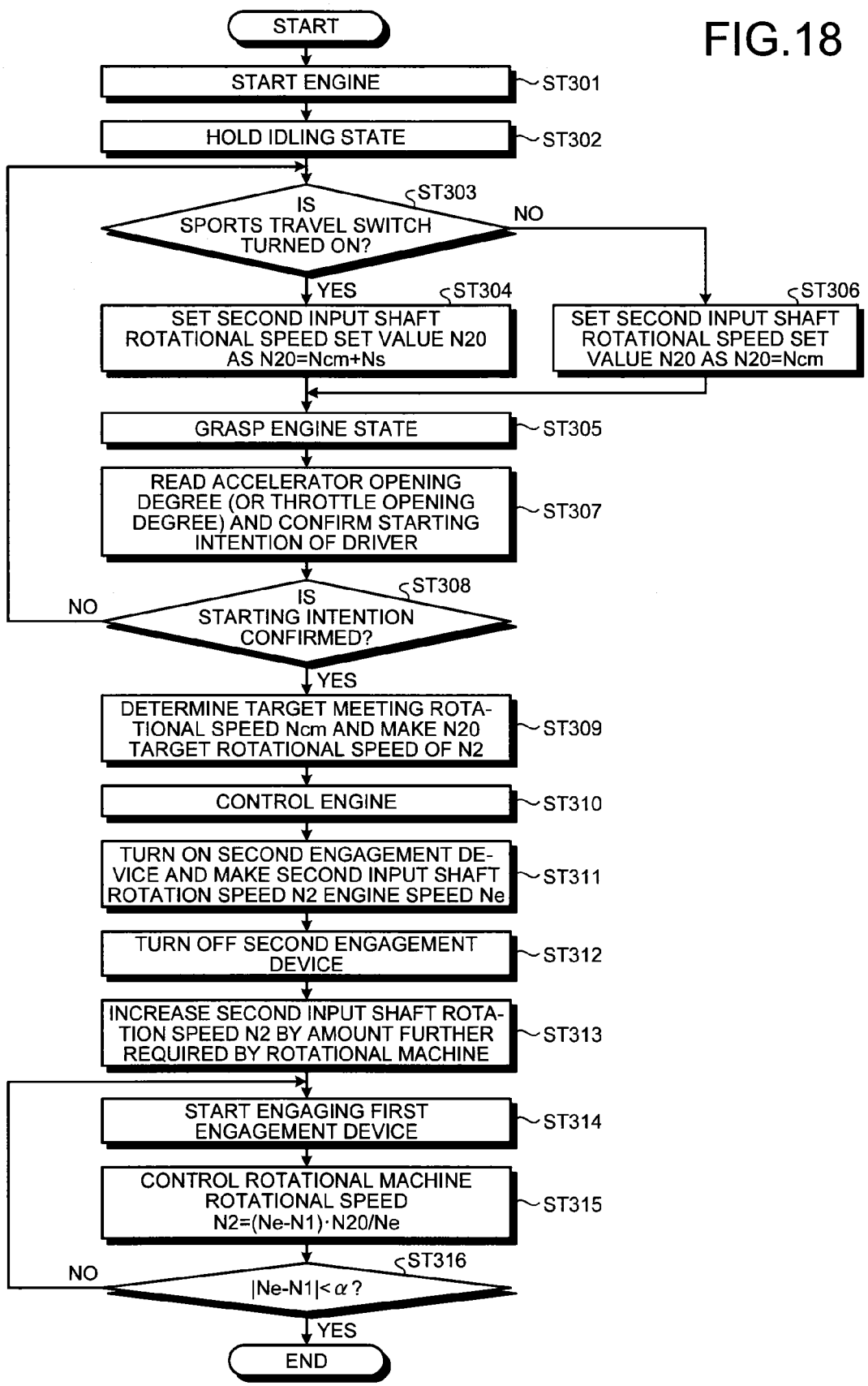
FIG. 18 is a flowchart illustrating an example of control of the transmission according to the fourth embodiment.

FIGS. 13, 14, and 15 are alignment charts illustrating an example of operation of a transmission according to a fourth embodiment. FIG. 16 is a diagram illustrating operation of an engagement device of the transmission according to the fourth embodiment. FIG. 17 is a diagram illustrating an example of a torque property of the transmission according to the fourth embodiment. FIG. 18 is a flowchart illustrating an example of control of the transmission according to the fourth embodiment. A transmission for vehicle and a control device according to the fourth embodiment are different from those of the first, second, and third embodiments in that they make energy stored in a second input shaft relatively large at the time of sudden starting request and the like. Meanwhile, as for configurations of the transmission for vehicle and the control device according to the fourth embodiment, FIG. 1 and the like is appropriately referred to.

In a transmission 401 as the transmission for vehicle according to this embodiment (refer to FIG. 1), an ECU 50 as the control device controls to make the energy stored in a second input shaft 14 relatively large at the time of the sudden starting request and the like of a vehicle 2. The sudden starting request time of the vehicle 2 includes a case in which a sports travel mode is selected by a driver and the like, for example, but there is no limitation. At the time of the sudden starting request and the like of the vehicle 2, the ECU 50 controls a rotational machine 30 to adjust differential rotation of a differential mechanism 20, thereby making the energy stored in the second input shaft 14 relatively large and discharges the stored energy as power used for starting the vehicle 2 at the time of sudden start of the vehicle 2.

Specifically, a second engagement device C2 is put into an engaged state in a state in which an engine 4 operates before the vehicle 2 starts traveling, so that the ECU 50 stores rotational power transmitted from the engine 4 through the second engagement device C2 as inertia energy and thereafter performs control regarding further increase in stored energy. That is to say, the ECU 50 puts the second engagement device C2 into a disengaged state, controls the rotational machine 30 to output the rotational power, and stores the rotational power in the second input shaft 14 as the inertia energy.

Next, the energy storage in the second input shaft 14 before the start and discharge of the stored energy at the time of the sudden starting request are described in more detail with a specific example with reference to FIGS. 13, 14, 15, 16, and 17. FIGS. 13, 14, and 15 are the alignment charts illustrating a differential state of the differential mechanism 20. In FIG. 16, time is plotted along a horizontal axis and a rotational speed is plotted along a vertical axis. In FIG. 16, dotted line L61, solid line L62, and dashed-dotted line L63 indicate an engine speed, a first input shaft rotational speed, and a rotational machine rotational speed, respectively. In FIG. 17, a speed ratio and a torque ratio of the transmission 401 are plotted along a horizontal axis and a vertical axis, respectively.

The ECU 50 first puts a first-speed gear stage 61 being a starting stage into an engaged state by a switching unit 66 and other gear stages into a disengaged state to make a state in which the first-speed gear stage 61 is selected as the starting stage in a state in which the vehicle 2 stops when storing the inertia energy in the second input shaft 14 before the vehicle 2 starts traveling. At that time, the ECU 50 controls a brake device of the vehicle 2 to make a braked state and stops rotation of a first input shaft 13, for example. Then, the ECU 50 starts the engine 4 to put the engine 4 into the operating state, for example, the idling state, and makes an engine speed Ne constant. At that time, the ECU 50 puts both the first engagement device C1 and the second engagement device C2 into the disengaged state. FIG. 13 illustrates the differential state at that time.

The ECU 50 puts the second engagement device C2 into the engaged state while the engine 4 is operating. According to this, in the transmission 401, a rotational speed of a ring gear 20R and the second input shaft 14 increases (refer to arrow A in FIG. 14) to be synchronized with (becomes equivalent to) the engine speed Ne while the rotational speed of a sun gear 20S and the rotational machine 30 increases in a direction opposite to that of the ring gear 20R and the second input shaft 14 in a state in which rotation of the carrier 20C and the first input shaft 13 is stopped as indicated by solid line L51 in FIG. 14. As a result, the transmission 401 may store the rotational power transmitted from the engine 4 to the second input shaft 14 through the second engagement device C2 in the second input shaft 14 as the inertia energy.

Furthermore, the ECU 50 puts the second engagement device C2 into the disengaged state in this state and controls the rotational machine 30 to perform power running in a rotational direction opposite to that of the second input shaft 14, thereby outputting the rotational power. According to this, in the transmission 401, the rotational speed of the ring gear 20R and the second input shaft 14 further increases to be higher than the engine speed Ne (refer to arrow B in FIG. 14) as indicated by solid line L52 in FIG. 14. As a result, the transmission 401 may further store the rotational power output from the rotational machine 30 to be transmitted to the second input shaft 14 through the differential mechanism 20 in the second input shaft 14 as the inertia energy.

Then, the ECU 50 controls the rotation of the rotational machine 30 to adjust the differential rotation of the differential mechanism 20 and puts the first engagement device C1 into the engaged state when the vehicle 2 starts traveling. At that time, the ECU 50 controls the rotational machine 30 and generates electric power by the rotational machine 30. According to this, in the transmission 401, the differential state of the differential mechanism 20 transits as illustrated in FIG. 15. That is to say, in the transmission 401, the rotational speed of the sun gear 20S and the rotational machine 30 decreases toward 0 (refer to dashed-dotted line L63 in FIG. 16) and the inertia energy of the ring gear 20R and the second input shaft 14 is discharged to the carrier 20C and the first input shaft 13, and the rotational speed of the carrier 20C and the first input shaft 13 (refer to solid line L62 in FIG. 16) increases toward the engine speed (refer to dotted line L61 in FIG. 16).

As a result, the transmission 401 of this embodiment stores the rotational power from the engine 4 in the second input shaft 14 as the inertia energy as indicated by solid line L71 in FIG. 17 and may realize a relatively large torque ratio as compared to a case in which the rotational power from the rotational machine 30 is not stored (dashed dotted line L72 in FIG. 17). In this case, a maximum torque ratio T0' may be represented as [T0'=(1+Fo·(1+1/ρ))/Fe], for example. The transmission 401 may control the rotational machine 30 to control MG control torque Fo, thereby arbitrarily optimizing the torque property as needed as in the above-described case when discharging the energy stored in the second input shaft 14 when the vehicle 2 starts traveling.

Next, an example of travel starting control by the ECU 50 is described with reference to the flowchart in FIG. 18. Meanwhile, herein also, the description overlapped with the description in FIG. 6 is omitted as far as possible.

First, the ECU 50 starts the engine 4 (step ST301) and holds the engine 4 in the idling state (step ST302).

Next, the ECU 50 determines whether a sports travel switch of the vehicle 2 is turned on based on a detection result by a vehicle state detection device 51 (step ST303).

When the ECU 50 determines that the sports travel switch of the vehicle 2 is turned on (Yes at step ST303), that is to say, determines that the sudden start is requested by the driver, this makes a second input shaft rotational speed set value N20 a sum of a target meeting rotational speed Ncm and a sports mode rotational speed increase Ns (N20=Ncm+Ns) (step ST304), and grasps the state of the engine 4 based on the detection result by the vehicle state detection device 51 (step ST305). The second input shaft rotational speed set value N20 is a set rotational speed when the rotational machine 30 controls the rotational speed of the second input shaft 14. The target meeting rotational speed Ncm is similar to that described above. The sports mode rotational speed increase Ns may be set in advance according to acceleration requested at the time of the sudden start and the like, for example.

On the other hand, when the ECU 50 determines that the sports travel switch of the vehicle 2 is turned off (No at step ST303), that is to say, when this determines that the sudden start is not requested by the driver (case of normal start), this sets the second input shaft rotational speed set value N20 to the target meeting rotational speed Ncm (N20=Ncm) (step ST306) and grasps the state of the engine 4 based on the detection result by the vehicle state detection device 51 (step ST305).

The ECU 50 reads an accelerator opening degree (or throttle opening degree) based on the detection result by the vehicle state detection device 51 and confirms a starting intention of the driver by various methods (step ST307) after the process at step ST305.

The ECU 50 determines whether the starting intention of the driver may be confirmed (step ST308) and when this determines that the starting intention is not confirmed (No at step ST308), this shifts the procedure to step ST303 and repeatedly executes following processes.

When the ECU 50 determines that the starting intention of the driver is confirmed (Yes at step ST308), this determines the target meeting rotational speed Ncm based on the accelerator opening degree and the like and makes the second input shaft rotational speed set value N20 set at step ST304 or step ST306 a target rotational speed of an actual second input shaft rotational speed N2 when the rotation of the second input shaft 14 is controlled by the rotational machine 30 (step ST309).

Next, the ECU 50 controls the engine 4 such that the engine speed is maintained at the target meeting rotational speed Ncm determined at step ST309 (step ST310).

Next, the ECU 50 puts the second engagement device C2 into the engaged state (on) and increases the actual second input shaft rotational speed N2 to reach the engine speed Ne (in other words, target meeting rotational speed Ncm) (step ST311).

Next, the ECU 50 puts the second engagement device C2 into the disengaged state (off) (step ST312).

Next, the ECU 50 further increases the second input shaft rotational speed N2 by an amount further required by the rotational machine 30 according to the target rotational speed set at step ST309 (step ST313). In other words, the ECU 50 increases the second input shaft rotational speed N2 according to the sports mode rotational speed increase Ns by the rotational machine 30 when the sports travel switch is turned on (at the time of sudden starting request). The ECU 50 does not increase the second input shaft rotational speed N2 when the sports travel switch is turned off (at the time of normal state).

Next, the ECU 50 starts engaging the first engagement device C1 while maintaining the engine speed at the target meeting rotational speed Ncm by controlling the engine 4 (step ST314).

Next, the ECU 50 controls the rotational speed of the rotational machine 30 (step ST315). In this case, the ECU 50 controls the rotational speed of the rotational machine 30 such that the actual second input shaft rotational speed N2 reaches the rotational speed represented by equation (7), for example.

$$N2=(Ne-N1)\cdot N20/Ne \qquad (7)$$

Next, the ECU 50 determines whether an absolute value of difference between the engine speed Ne and a first input shaft rotational speed N1 is smaller than a set reference value α set in advance (step ST316).

When the ECU 50 determines that the absolute value of the difference between the engine speed Ne and the first input shaft rotational speed N1 is not smaller than the set reference value α (No at step ST316), this shifts the procedure to step ST314 and repeatedly executes following processes.

The ECU 50 finishes the travel starting control when determining that the absolute value of the difference between the engine speed Ne and the first input shaft rotational speed N1 is smaller than the set reference value α (Yes at step ST316) and shifts to a normal travel mode.

The transmission 401 configured in the above-described manner may store the rotational power from the engine 4 and the rotational power from the rotational machine 30 in the second input shaft 14 as the inertia energy before the vehicle 2 starts traveling, so that this may store more inertia energy in the second input shaft 14. Then, the transmission 401 may discharge the energy stored in the second input shaft 14 as the power for start when the vehicle 2 starts traveling. Therefore, the transmission 401 may further improve a torque amplifying action to improve starting performance without using an overload area (area with relatively poor efficiency) of the engine 4 even when the driver issues the sudden starting request, for example, so that this may realize the requested acceleration and inhibit deterioration in fuel consumption performance.

The transmission 401 and the ECU 50 according to the above-described embodiment may start the vehicle 2 by using both the power transmitted from the engine 4 to the first input shaft 13 and the power stored in the second input shaft 14 in advance to be transmitted to the first input shaft 13 through the differential mechanism 20, so that they may improve the starting performance.

Furthermore, according to the transmission 401 according to the above-described embodiment, the second engagement device C2 is put into the engaged state while the engine 4 is operating before the vehicle 2 starts traveling, so that the ECU 50 stores the rotational power transmitted from the engine 4 to the second input shaft 14 through the second engagement device C2 as the inertia energy and thereafter puts the second engagement device C2 into the disengaged state, controls the rotational machine 30 to output the rotational power, and stores the rotational power in the second input shaft 14 as the inertia energy. Therefore, the transmission 401 and the ECU 50 may store the rotational power from the engine 4 and the rotational power from the rotational machine 30 in the second input shaft 14 as the inertia energy before the vehicle 2 starts traveling and discharge the energy stored in the second input shaft 14 as the power for start when the vehicle 2 starts traveling, so that they may further improve the starting performance.

[Fifth Embodiment]

Figure 19:
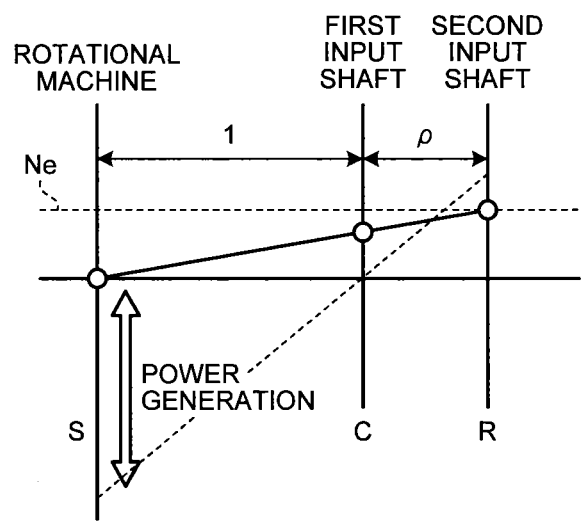
FIG. 19 is an alignment chart illustrating an example of operation of a transmission according to a fifth embodiment.
Figure 20:
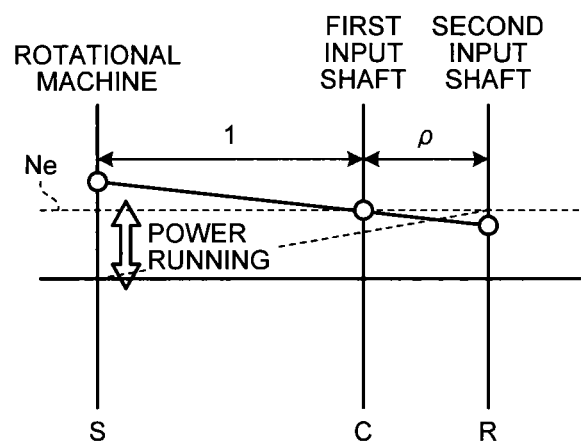
FIG. 20 is an alignment chart illustrating an example of the operation of the transmission according to the fifth embodiment.
Figure 21:
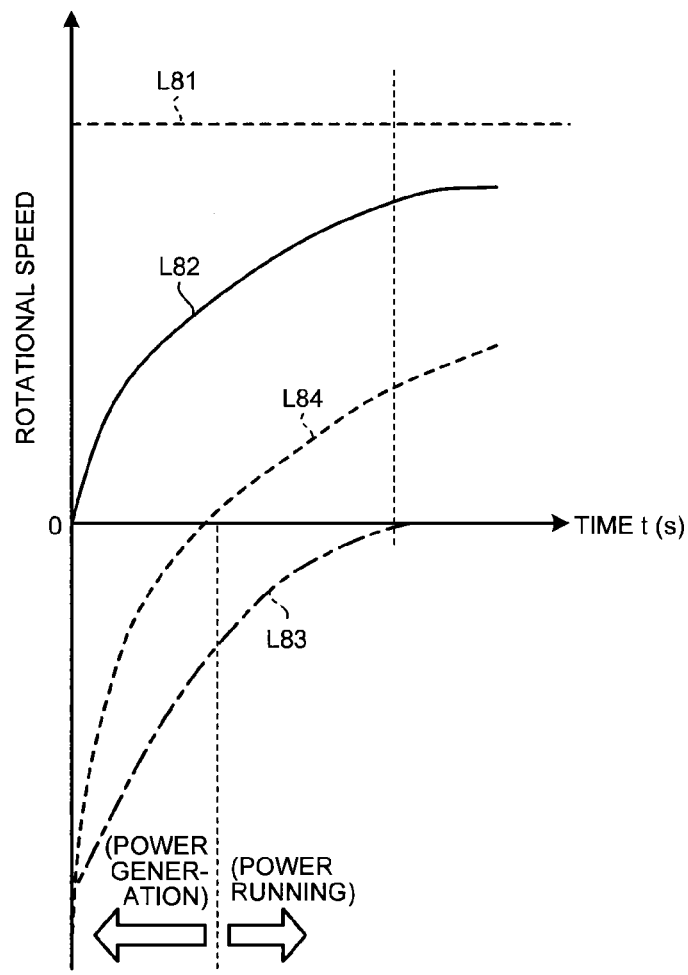
FIG. 21 is a diagram illustrating operation of an engagement device of the transmission according to the fifth embodiment.
Figure 22:
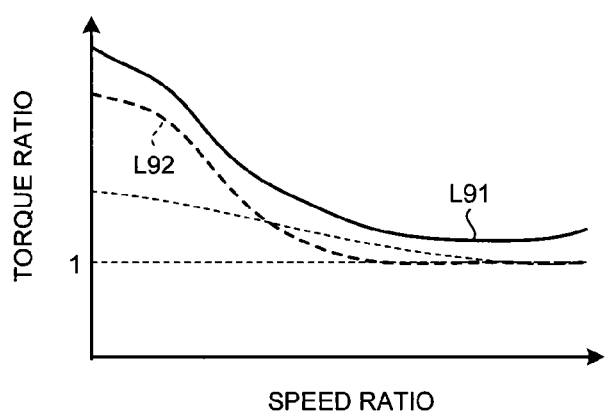
FIG. 22 is a diagram illustrating an example of a torque property of the transmission according to the fifth embodiment.

FIGS. 19 and 20 are alignment charts illustrating an example of operation of a transmission according to a fifth embodiment. FIG. 21 is a diagram illustrating operation of an engagement device of the transmission according to the fifth embodiment. FIG. 22 is a diagram illustrating an example of a torque property of the transmission according to the fifth embodiment. A transmission for vehicle and a control device according to the fifth embodiment are different from those of the first, second, third, and fourth embodiments in that they allow a rotational machine to output rotational power used for starting a vehicle. Meanwhile, as for configurations of the transmission for vehicle and the control device according to the fifth embodiment, FIG. 1 and the like is appropriately referred to.

In a transmission 501 as the transmission for vehicle according to this embodiment (refer to FIG. 1), an ECU 50 as the control device controls to allow a rotational machine 30 to output the rotational power used for starting the vehicle 2. The ECU 50 controls the rotational machine 30 to output the rotational power as the power used for starting the vehicle 2 after the rotational speed of the rotational machine 30 reaches 0 when putting a second engagement device C2 into a disengaged state, thereafter controlling rotation of the rotational machine 30, and putting a first engagement device C1 into an engaged state when the vehicle 2 starts traveling. In other words, when the vehicle 2 starts traveling, after discharge of stored energy stored in a second input shaft 14 is completed, the ECU 50 further performs power running of the rotational machine 30 to output the rotational power used for starting the vehicle 2, thereby assisting an engine 4. The transmission 1 further performs the power running of the rotational machine 30 in a period T3 after time t12 at which the discharge (primary discharge) of the energy stored in the second input shaft 14 is completed to output the rotational power used for starting the vehicle 2 (secondary discharge, refer to dotted line L25 in FIG. 7) in FIG. 7 described above, for example.

Time at which the primary discharge being the discharge of the energy stored in the second input shaft 14 is completed typically is time at which a rotational machine rotational speed reaches 0 from a state in which the rotational machine 30 generates electric power when the energy stored in the second input shaft 14 is discharged. The secondary discharge after the primary discharge is completed is performed by the power running of the rotational machine 30 to output the rotational power used for starting the vehicle 2 after the rotational machine rotational speed reaches 0. In this case, torque from the rotational machine 30 is amplified as in the case of the discharge of the energy stored in the second input shaft 14 to be transmitted to a first input shaft 13.

Next, the discharge of the energy when the vehicle 2 starts traveling is described in more detail with a specific example with reference to FIGS. 19, 20, 21, and 22. FIGS. 19 and 20 are the alignment charts illustrating a differential state of a differential mechanism 20. In FIG. 21, time is plotted along a horizontal axis and the rotational speed is plotted along a vertical axis. In FIG. 21, dotted line L81 indicates an engine speed, solid line L82 indicates a first input shaft rotational speed, dashed-dotted line L83 indicates the rotational machine rotational speed when the rotational machine 30 does not assist, and dotted line L84 indicates the rotational machine rotational speed when the rotational machine 30 assists. In FIG. 22, a speed ratio and a torque ratio of the transmission 501 are plotted along a horizontal axis and a vertical axis, respectively. In FIG. 22, solid line L91 indicates the torque ratio when the rotational machine 30 assists and dotted line L92 indicates the torque ratio when the rotational machine 30 does not assist. Meanwhile, FIGS. 14 and 15 described above are also herein appropriately referred to.

The ECU 50 puts the second engagement device C2 into an engaged state in a state in which the engine 4 operates as described above. According to this, in the transmission 501, a rotational speed of a ring gear 20R and the second input shaft 14 increases (refer to arrow A in FIG. 14) to be synchronized with (becomes equivalent to) an engine speed Ne while a rotational speed of a sun gear 20S and the rotational machine 30 increases in a direction opposite to that of the ring gear 20R and the second input shaft 14 in a state in which rotation of the carrier 20C and the first input shaft 13 is stopped. As a result, the transmission 501 may further store the rotational power transmitted from the engine 4 to the second input shaft 14 through the second engagement device C2 in the second input shaft 14 as inertia energy.

The ECU 50 puts the second engagement device C2 into the disengaged state in this state and controls the rotational machine 30 to perform power running in a rotational direction opposite to that of the second input shaft 14, thereby outputting the rotational power. According to this, in the transmission 501, the rotational speed of the ring gear 20R and the second input shaft 14 increases to be higher than the engine speed Ne (refer to arrow B in FIG. 14). As a result, the transmission 501 may store the rotational power output from the rotational machine 30 to be transmitted to the second input shaft 14 through the differential mechanism 20 in the second input shaft 14 as the inertia energy.

Then, the ECU 50 controls the rotation of the rotational machine 30 to adjust the differential rotation of the differential mechanism 20 and puts the first engagement device C1 into the engaged state when the vehicle 2 starts traveling. At that time, the ECU 50 controls the rotational machine 30 and generates electric power by the rotational machine 30 (refer to FIG. 15). That is to say, in the transmission 501, the rotational speed of the sun gear 20S and the rotational machine 30 decreases toward 0 (refer to dotted line L84 in FIG. 21) and the inertia energy of the ring gear 20R and the second input shaft 14 is discharged to the carrier 20C and the first input shaft 13, and the rotational speed of the carrier 20C and the first input shaft 13 (refer to solid line L82 in FIG. 21) increases toward the engine speed (refer to dotted line L81 in FIG. 21).

In the transmission 501, the primary discharge of the inertia energy stored in the second input shaft 14 is completed when the rotational speed of the sun gear 20S and the rotational machine 30 decreases to reach 0 by the power generation by the rotational machine 30 as illustrated in FIG. 19. In this case, the transmission 501 makes a power generation amount relatively large by the rotational machine 30 in the primary discharge, so that time at which the rotational speed of the rotational machine 30 reaches 0 becomes relatively early as compared to a case in which the rotational machine 30 does not assist (refer to dashed-dotted line L83 in FIG. 21) as indicated by dotted line L84 in FIG. 21, but this may make an apparent torque ratio at that time relatively large (refer to FIG. 22).

The ECU 50 controls the rotational machine 30, performs the power running of the rotational machine 30, and outputs the rotational power used for starting the vehicle 2 as the secondary discharge, thereby assisting the engine 4 after the rotational speed of the sun gear 20S and the rotational machine 30 reaches 0 and the primary discharge of the inertia energy stored in the second input shaft 14 is completed as illustrated in FIG. 20. That is to say, in the rotational machine 30 of the transmission 501, the power generation and the power running are switched at time at which the rotational speed of the rotational machine 30 reaches 0 as illustrated in FIGS. 19, 20, and 21. In this case, in the transmission 501, the second input shaft 14 and the like serves as a reaction force receiving member. In this case, the rotational machine 30 may typically perform the power running by using electric energy stored in an electric storage device 40 at the time of primary discharge to output the rotational power used for starting the vehicle 2.

As a result, the transmission 501 may make the apparent torque ratio relatively large as compared to the case in which the rotational machine 30 does not assist (refer to dotted line L92 in FIG. 22) as indicated by solid line L91 in FIG. 22, for example, so that this may further improve starting performance, for example.

The transmission 501 and the ECU 50 according to the above-described embodiment may start the vehicle 2 by using both the power transmitted from the engine 4 to the first input shaft 13 and the power stored in the second input shaft 14 in advance to be transmitted to the first input shaft 13 through the differential mechanism 20, so that they may improve the starting performance.

Furthermore, according to the transmission 501 according to the above-described embodiment, the ECU 50 controls the rotational machine 30 to output the rotational power as the power used for starting the vehicle 2 after the rotational speed of the rotational machine 30 reaches 0 when putting the second engagement device C2 into the disengaged state, thereafter controlling the rotation of the rotational machine 30, and putting the first engagement device C1 into the engaged state when the vehicle 2 starts traveling. Therefore, the transmission 501 and the ECU 50 may assist the power used for starting the vehicle 2 by the rotational power output from the rotational machine 30 also after the discharge of the stored energy stored in the second input shaft 14 is completed when the vehicle 2 starts traveling, so that they may further improve the starting performance.

Meanwhile, the transmission for vehicle and the control device according to the above-described embodiments of the present invention are not limited to those of the above-described embodiments and may be variously modified within the scope of claims. The transmission for vehicle and the control device according to this embodiment may also be formed by appropriate combination of the components of the embodiments described above.

For example, a connection relationship among the rotational elements of the differential mechanism, the rotational shaft of the rotational machine, the first input shaft, and the second input shaft is not limited to the above-described relationship.

Figure 23:
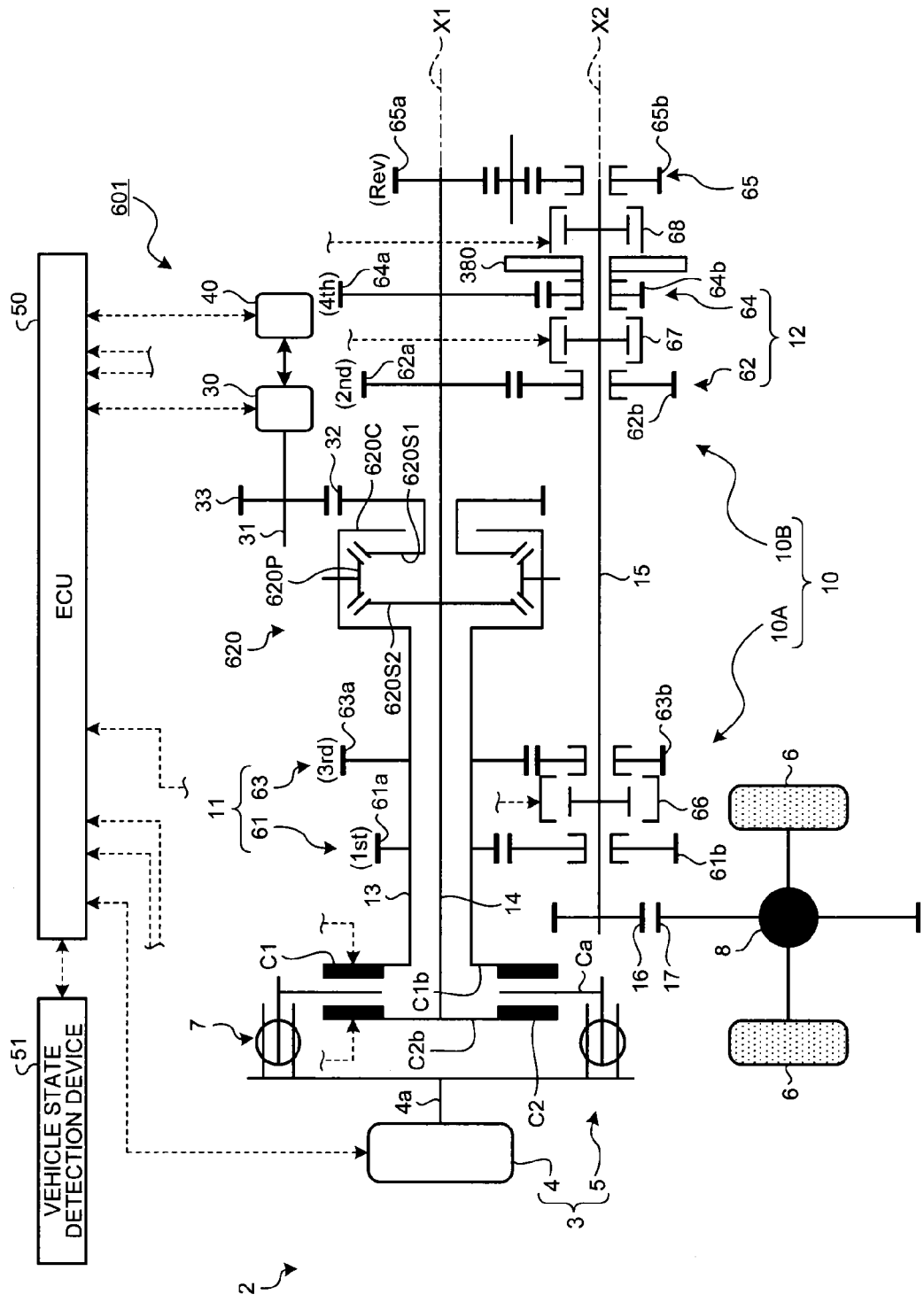
FIG. 23 is a schematic configuration diagram of a vehicle on which a transmission according to a variation is mounted.

FIG. 23 is a schematic configuration diagram of a vehicle on which a transmission according to a variation is mounted. A differential mechanism 620 of a transmission 601 according to the variation illustrated in FIG. 23 is formed of a so-called differential gear. Herein, the differential mechanism 620 includes a first sun gear 620S1, a second sun gear 620S2, and a carrier 620C as a plurality of rotational elements capable of differentially rotating relative to one another. The carrier 620C holds a plurality of pinion gears 620P. In the differential mechanism 620 of this variation, the first sun gear 620S1 is the element connected to a rotational shaft 31 of the rotational machine 30, the second sun gear 620S2 is the element connected to the second input shaft 14, and the carrier 620C is the element connected to the first input shaft 13. The transmission 601 may start the vehicle 2 by using both power transmitted from an engine 4 to the first input shaft 13 and the power stored in the second input shaft 14 in advance to be transmitted to the first input shaft 13 through the differential mechanism 620 also when the differential mechanism 620 is formed in this manner, so that this may improve starting performance.

Figure 24:
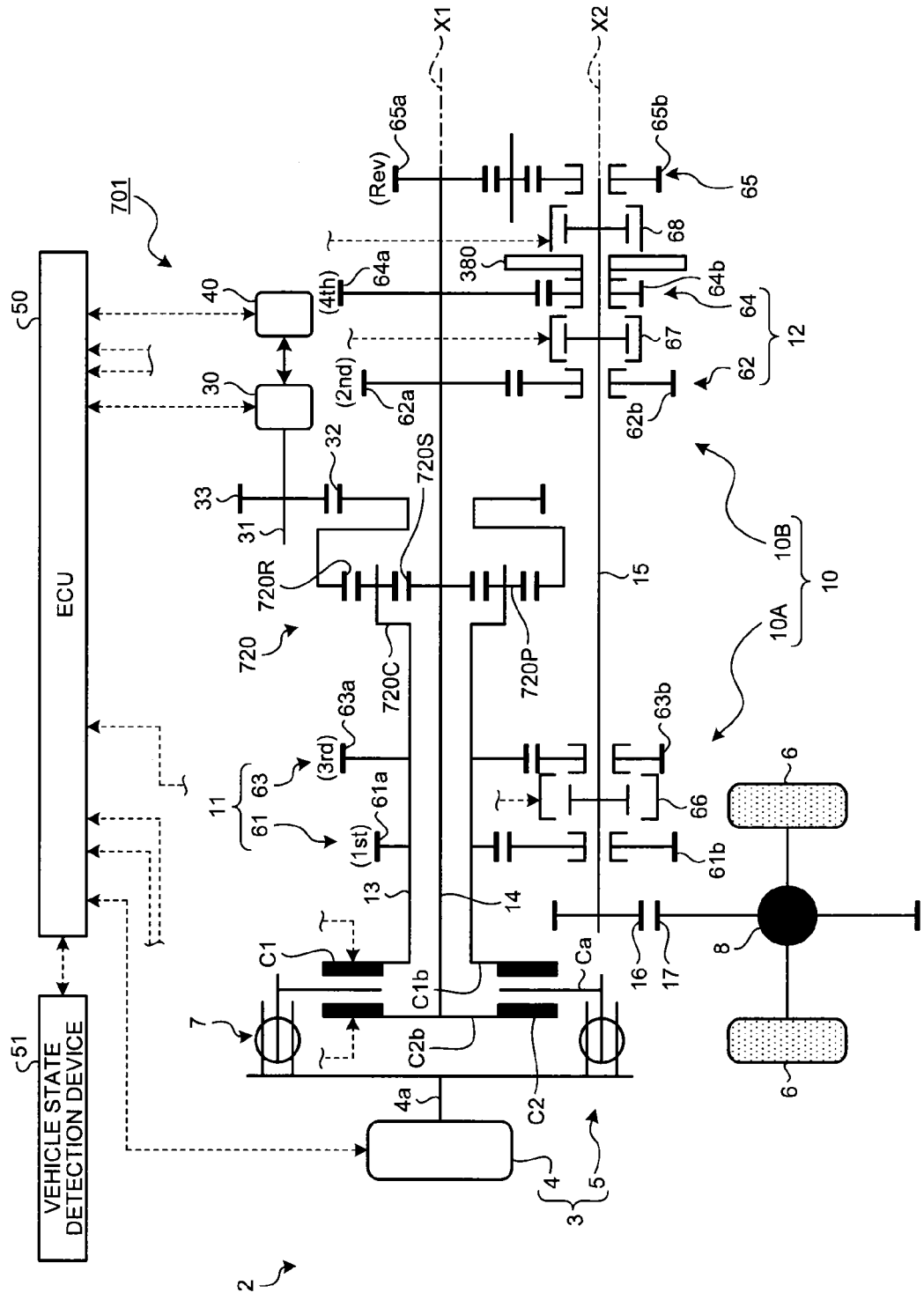
FIG. 24 is a schematic configuration diagram of a vehicle on which a transmission according to a variation is mounted.

FIG. 24 is a schematic configuration diagram of a vehicle on which a transmission according to another variation is mounted. A differential mechanism 720 of a transmission 701 according to the variation illustrated in FIG. 24 is formed of a so-called single pinion planetary gear mechanism. Herein, the differential mechanism 720 includes a sun gear 720S, a ring gear 720R, and a carrier 720O as a plurality of rotational elements capable of differentially rotating relative to one another. The carrier 720C holds a plurality of pinion gears 720P. In the differential mechanism 720 of this variation, the ring gear 720R is the element connected to the rotational shaft 31 of a rotational machine 30, the sun gear 720S is the element connected to the second input shaft 14, and the carrier 720C is the element connected to the first input shaft 13. The transmission 701 may start a vehicle 2 by using both power transmitted from an engine 4 to the first input shaft 13 and the power stored in the second input shaft 14 in advance to be transmitted to the first input shaft 13 through the differential mechanism 720 also when the differential mechanism 720 is formed in this manner, so that this may improve starting performance.

The vehicle described above may be a so-called "hybrid vehicle" provided with a motor generator and the like as an electric motor capable of generating electric power in addition to the engine as a power source for travel.

In the description above, the control device of the transmission for vehicle is described to double as the ECU 50, but there is no limitation. For example, the control device may be formed separately from the ECU 50 so as to be configured to communicate information such as a detection signal, a driving signal, a control instruction and the like with each other.

REFERENCE SIGNS LIST 1, 201, 301, 401, 501, 601, 701 TRANSMISSION (TRANSMISSION FOR VEHICLE)
2 VEHICLE
3 POWER TRAIN
4 ENGINE
5 POWER TRANSMISSION DEVICE
6 DRIVEN WHEEL
7 DAMPER
8 DIFFERENTIAL GEAR

10 TRANSMISSION MECHANISM
10A ODD-NUMBERED STAGE TRANSMISSION UNIT
10B EVEN-NUMBERED STAGE TRANSMISSION UNIT
11 ODD-NUMBERED GEAR STAGE GROUP (FIRST GEAR STAGE GROUP)
12 EVEN-NUMBERED GEAR STAGE GROUP (SECOND GEAR STAGE GROUP)
13 FIRST INPUT SHAFT
14 SECOND INPUT SHAFT
15 OUTPUT SHAFT
20, 220, 620, 720 DIFFERENTIAL MECHANISM
30 ROTATIONAL MACHINE
31 ROTATIONAL SHAFT
40 ELECTRIC STORAGE DEVICE
50 ECU (CONTROL DEVICE)
51 VEHICLE STATE DETECTION DEVICE
280, 380 ROTATIONAL BODY (INERTIA MASS BODY)
C1 FIRST ENGAGEMENT DEVICE
C2 SECOND ENGAGEMENT DEVICE

The invention claimed is:

1. A transmission for vehicle, comprising:
a transmission mechanism including:
 a first engagement device configured to block/allow power transmission between an engine which generates rotational power for allowing a vehicle to travel and a first input shaft of a first gear stage group; and
 a second engagement device configured to block/allow power transmission between the engine and a second input shaft of a second gear stage group;
a differential mechanism which connects a rotational shaft of a rotational machine, the first input shaft, and the second input shaft so as to be differentially rotatable; and
a control device configured to perform travel starting control to start traveling of the vehicle by controlling the engine, the first engagement device, the second engagement device, and the rotational machine,
wherein the first gear stage group includes a starting stage used at a time the vehicle starts traveling, and
the control device is configured to perform the travel starting control to start traveling of the vehicle by: putting the second engagement device into an engaged state while the engine is operating before the vehicle starts traveling; and putting the second engagement device into a disengaged state, thereafter controlling rotation of the rotational machine and putting the first engagement device into an engaged state at the time the vehicle starts traveling.

2. The transmission for vehicle according to claim 1,
wherein the second engagement device is put into the engaged state while the engine is operating, so that the second input shaft stores the rotational power transmitted from the engine through the second engagement device as inertia energy before the vehicle starts traveling, and
at the time the vehicle starts traveling, the second engagement device is put into the disengaged state, thereafter rotation of the rotational machine is controlled and the first engagement device is put into the engaged state, so that the second input shaft discharges the stored inertia energy to the first input shaft through the differential mechanism as the power used for starting traveling of the vehicle.

3. The transmission for vehicle according claim 1, wherein the control device generates electric power by the rotational machine by using the rotational power transmitted from the second input shaft to the rotational machine through the differential mechanism and stores generated electric energy in an electric storage device at the time the second engagement device is put into the disengaged state, thereafter controlling the rotation of the rotational machine, and putting the first engagement device into the engaged state at the time the vehicle starts traveling.

4. The transmission for vehicle according to claim 1, wherein the control device generates electric power by the rotational machine by using the rotational power transmitted from the engine to the rotational machine through the second engagement device, the second input shaft, and the differential mechanism and stores the generated electric energy in the electric storage device by putting the second engagement device into the engaged state while the engine is operating before the vehicle starts traveling.

5. The transmission for vehicle according to claim 1, wherein the control device controls the rotational machine to output the rotational power as the power used for starting traveling of the vehicle after a rotational speed of the rotational machine reaches 0 at the time the second engagement device is put into the disengaged state, thereafter controls the rotation of the rotational machine, and puts the first engagement device into the engaged state at the time the vehicle starts traveling.

6. The transmission for vehicle according to claim 1, wherein the control device puts the second engagement device into the engaged state while the engine is operating to store the rotational power transmitted from the engine to the second input shaft through the second engagement device as inertia energy before the vehicle starts traveling, thereafter puts the second engagement device into the disengaged state, controls the rotational machine to output the rotational power, and stores the rotational power in the second input shaft as the inertia energy.

7. The transmission for vehicle according to claim 1, further comprising an inertia mass body connected to the second input shaft.

8. The transmission for vehicle according to claim 1, wherein the control device is configured to adjust a torque ratio by controlling the rotation of the rotational machine at the time the vehicle starts traveling.

9. A control device of a transmission for vehicle, the control device comprising:
a transmission mechanism including:
 a first engagement device configured to block/allow power transmission between an engine which generates rotational power for allowing a vehicle to travel and a first input shaft of a first gear stage group; and
 a second engagement device configured to block/allow power transmission between the engine and a second input shaft of a second gear stage group; and
a differential mechanism which connects a rotational shaft of a rotational machine, the first input shaft, and the second input shaft so as to be differentially rotatable, wherein
the control device is configured to perform travel starting control to start traveling of the vehicle by controlling the engine, the first engagement device, the second engagement device, and the rotational machine,
the first gear stage group includes a starting stage used at a time the vehicle starts traveling, and the control device is configured to perform the travel starting control to start traveling of the vehicle by: putting the second engagement device into an engaged state while the engine is operating before the vehicle starts traveling; and putting the second engagement device into a disengaged state, thereafter controlling rotation of the rotational machine and putting the first engagement device into an engaged state at the time the vehicle starts traveling.

\* \* \* \* \*